United States Patent
Mitsuishi et al.

(10) Patent No.: US 6,484,154 B1
(45) Date of Patent: Nov. 19, 2002

(54) SAFE FOR ELECTRIC MONEY AND AN ELECTRIC MONEY SYSTEM

(75) Inventors: Kazuyuki Mitsuishi, Kanagawa (JP); Takumi Kishino, Kanagawa (JP); Toshiaki Ibi, Kanagawa (JP); Yasuyuki Higashiura, Kanagawa (JP); Koken Yamamoto, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/219,855

(22) Filed: Dec. 23, 1998

(30) Foreign Application Priority Data

Jul. 10, 1998 (JP) .............................. 10-196109

(51) Int. Cl.[7] .............................. G06F 17/60; G06K 5/00
(52) U.S. Cl. .............................. 705/64; 705/75; 705/76; 235/382
(58) Field of Search .............................. 705/16, 75, 64, 705/76, 65, 67; 235/380, 382

(56) References Cited

FOREIGN PATENT DOCUMENTS

| EP | 0 810 564 A2 | * | 5/1997 |
| EP | 0 778 550 A2 | * | 6/1997 |
| EP | 0 923 057 A2 | * | 6/1999 |

OTHER PUBLICATIONS

U.S. patent application Ser. No. 09/122,063, Jul. 1998.*
U.S. patent application Ser. No. 09/122,063, filed Jul. 24, 1998.
Japanese Patent Application No. HEI 9–335267 filed Dec. 5, 1997.

* cited by examiner

Primary Examiner—Cuong H. Nguyen
(74) Attorney, Agent, or Firm—Armstrong, Westerman & Hattori, LLP

(57) ABSTRACT

A command from an upper device is transferred from a communicating section via three bus interfaces to three command control sections and a result of the command processing is transferred therethrough from each of the command control sections to the communicating section and, a diagnosis command is transferred from the communicating section via three diagnosis check paths to the command control sections and a result of the diagnosis is transferred therethrough from each of the command control section to the communicating section. A command received from the upper device is transferred to a command control section or command control sections confirmed as normal as a result of diagnosis for execution of the command processing.

20 Claims, 25 Drawing Sheets

SAFE FOR ELECTRIC MONEY AND AN ELECTRIC MONEY SYSTEM

FIELD OF THE INVENTION

The present invention relates to a safe for electronic money and an electronic money system for managing electronic money indicating a value of currency with electronic information monolithically, and more specifically to a safe for electronic money used in business transactions using an IC card and an electronic money system using the safe for electronic money.

BACKGROUND OF THE INVENTION

In recent years, hot social attentions are concentrating on a so-called electronic money system. In this system electronic digital data is used as money for a means of clearance in place of the traditional bills or coins because of the safety and convenience in clearance for business transaction. Therefore, financial institutions such as banks are required to install a safe for electronic money (hereafter abbreviated as safe) for batch management of electronic money, and safes with high reliability are in demand.

When a customer loads electronic money in an IC card using a load terminal of a bank, it is necessary to directly exchange electronic money between the customer's IC card and a safe in the bank. For this purpose, a storage section with data for electronic money stored therein is provided in the safe. This makes it possible to directly exchange electronic money upon a load request from a customer between the customer's IC card and the storage section of the safe.

Strong security is required for a safe, and a technology of multiplexing is known for transferring electronic money to enable verification of validity of the transaction.

Description is made for a conventional type of safe. FIG. 24 shows functional configuration of a conventional type of safe. This safe has, as shown in FIG. 24, mainly three command control sections 201, 202 and 203 each connected to a communicating section 100. The command control sections 201, 202 and 203 are connected to the communicating section 100 via bus interfaces 301, 302 and 303 respectively. The communicating section 100 has a comparator 101 which compares the results of execution by the command control sections 201 to 203 to each other. The communicating section 100 is connected to an upper device, which is not shown herein, via a bus interface 400, and receives a command for processing via the bus interface 400 from the upper device.

Next, operations of the safe having the configuration as described above is explained. To improve the reliability, the safe in FIG. 24 has, for instance, three command control sections 201, 202 and 203. The communicating section 100 instructs the command control sections 201 to 203 to execute the same processing according to an instruction from the upper device, and receives a result from each of the command control sections 201 to 203. The communicating section 100 compares the results sent from the command control sections 201 to 203 using the comparator 101, and executes processing for multiplexing such as confirmation of normality in the processing. Also each of the command control sections 201 to 203 stores a value for the electronic money therein, and manages the value by processing commands from the communicating section 100.

However, in the safe based on the conventional technology as described above, identical processing is executed in each of the command control sections 201 to 203 under controls by the communicating sections 100, so that an identical value is stored as electronic money in each of the command control sections 201 to 203 and physically a value three times larger than the actual value is stored in the system.

Therefore, illegal modification of the system using the multiplexing technology allows, for instance, the case as shown in FIG. 25. FIG. 25A shows a case where an interface between the communicating section 100 and command control section 201 has been modified. In the case shown in FIG. 25A, only the command control section 201 is connected via the bus interface 304 to the communicating section 100 and the other two terminals of the communicating section 100 are connected to the bus interface 304.

FIG. 25B shows a case where an interface between the communicating section 100 and command control section 202 has been modified. In the case shown in FIG. 25B, only the command control section 202 is connected via the bus interface 305 to the communicating section 100 and the other two terminals of the communicating section 100 are connected to the bus interface 305. Although not shown herein, a case where an interface between the communicating section and command control section 203 is modified is conceivable.

A safe modified in a manner described above can be obtained through reverse engineering. When the safe is modified as above, only one command control section is connected to the communicating section 100. In such a case, when a value is drawn through the connection as shown in FIG. 25A, namely through the connection between the communicating section 100 and command control section 201, then a value is dawn through the connection shown in FIG. 25B, namely through the connection between the communicating section 100 and command control section 202, and further a value is dawn through the connected between the communicating section 100 and command control section 203 although not shown, a value three times larger than the original value can illegally be drawn.

As shown by the example of multiplexing described above, there has been the problem that an actual value is easily multiplied and the multiplexed drawing is possible.

SUMMARY OF THE INVENTION

To solve the problem in the conventional technology, it is an object of the present invention to provide a safe for electronic money and an electronic money system capable of preventing multiplex drawing of a value by way of controls for multiplexing.

With the invention, a command from an upper device is transferred from a communicating section to a command control section and a result of the command processing is transferred from the command control section to the communicating section through a first interface, and a command for diagnosis is transferred from the communicating section to the command control section and a result of the diagnosis is transferred from the command control section to the communicating section through a second interface. Therefore, even if a path for command processing is illegally operated, the illegal operation can easily be detected from the path for diagnosis, whereby it is possible to prevent multiplex drawing of a value by multiplexing control.

With the invention, paths for command processing and diagnosis are physically independent from each other, so that an illegal operation can easily be detected for each path, whereby it is possible to prevent multiplex drawing of a value by multiplexing control.

With the invention, a command from an upper device is transferred from a communicating section to a command control section and a result of the command processing is transferred from the command control section to the communicating section and a command for diagnosis is transferred from the communicating section to the command control section and a result of the diagnosis is transferred from the command control section to the communicating section through a single interface. Therefore, even if a path for command processing illegally operated, the illegal operation can easily be detected from the path for diagnosis during the data processing, whereby it is possible to prevent multiplex drawing of a value by multiplexing control.

With the invention, command processing to a plurality of command control sections is executed at the same timing, so that it is possible to prevent an illegal operation performed at different timing.

With the invention, the communicating section controls the processing for diagnosis to a plurality of command control sections at the same timing, so that it is possible to prevent an illegal operation performed at different timing.

With the invention, the communicating section controls command processing to a plurality of command control sections at different timing, so that it is possible to prevent an illegal operation by adjusting the timing.

With the invention, the communicating section controls processing for diagnosis to a plurality of command control sections at different timing, so that it is possible to prevent an illegal operation by adjusting the timing.

With the invention, a plurality of command control sections are connected to each bus interface, so that it is possible to prevent an illegal operation for each bus.

With the invention, the communicating section sets the timing for data transfer in the command control sections connected to each bus interface arbitrarily. Therefore, the capability for preventing an illegal operation can be enhanced as compared to a case where transfer is made according to a fixed sequence.

With the invention, the communicating section executes coding and decoding in communication with the command control section using a specific cryptographic key allocated to each command control section and the command control section executes coding and decoding in communication with the communicating section using a specific cryptographic key allocated to the command control section. Therefore, security for transferred contents can be maintained for each command control section.

With the invention, a cryptographic key allocated to each command control section is updated with a random number generator. Because the cryptographic key is not fixed the capability of preventing an illegal operation can be enhanced.

With the invention, before an ciphered command is transferred to the command control section, a cryptographic key used for encoding the command is ciphered with a specified cryptographic key and the ciphered command is notified, while, in the command control section, the cryptographic key notified from the communicating section is deciphered with a specified cryptographic key and an ciphered command transferred from the communicating section is deciphered by using the deciphered cryptographic key, so that it is possible to prevent an illegal operation each time a command is transferred.

With the invention, a plurality of paths are provided between the upper device and the safe for electronic money, and when a path in which a trouble is generated is detected, communicating is executed by switching to a path which is normal, so that a fail-safe function for continuing communications can be realized.

Other objects and features of this invention will become apparent from the following description with reference to the accompanying drawings.

DESCRIPTION OF PREFERRED EMBODIMENTS

Next detailed description is made for preferred embodiments of the safe for electronic money and electronic money system according to the present invention with reference to the related drawings.

Figure 1:
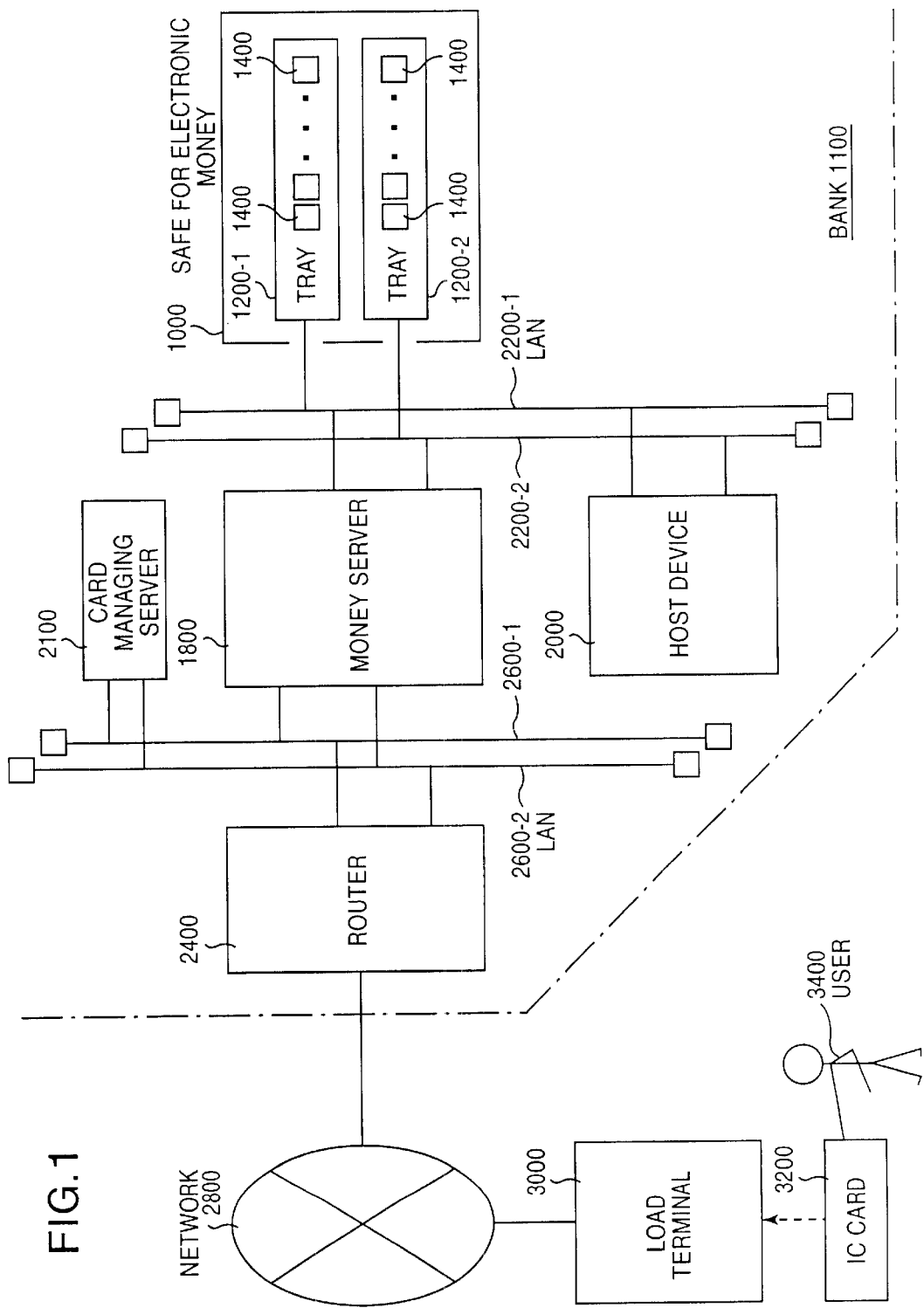
FIG. 1 is a block diagram showing an electronic money system in which a safe for electronic money according to the present invention is used.

FIG. 1 is a block diagram showing an electronic money system in which the safe for electronic money according to the present invention is used. In FIG. 1, provided in a bank 1100 are a safe for electronic money (abbreviated hereafter as safe) 1000, a money server 1800, a host device 2000, and a router 2400. The safe 1000 is connected via LANs 2200-1 and 2200-2 to the money server 1800, and further, the money server 1800 and card managing server 2100 are connected to the LANs 2600-1 and 2600-2.

The money server 1800 is connected to the router 2400 through LANs 2600-1 and 2600-2. The router 2400 in the bank 1100 is connected to an external network 2800 having a load terminal 3000. Transaction of electronic money can be executed with the money server 1800 in the bank 1100 using an IC card 3200 owned by a user 3400. Operations with the load terminal 3000 using the IC card 3200 are executed in the following order.

(1) The user 3400 sets the IC card 3200 in the load terminal 3000 and inputs transaction code such as load of electronic money, a password and an amount of money.
(2) The load terminal 3000 issues a request for transaction via the money server 1800 to the safe 1000.
(3) In response to a request for transaction from the load terminal 3000, the safe 1000 issues a request for authorization to check authenticity of the IC card 3200 via the money server 1800 to the load terminal 3000.
(4) In response to a request f or authorization, the load terminal 3000 returns an authorization indicating authenticity of the IC card 3200.
(5) When the authorization from the load terminal 3000 is received, the safe 1000 authorizes the IC card 3200 and notifies the money server 1800 of this.
(6) The money server 1800 issues a request for, for instance, an account number for changing a deposit account number at which the user 3400 owns a number of the IC card 3200 to the card managing server 2100.
(7) The card managing server 2100 returns an account number in response to the request for an account number or the like from the money server 1800.
(8) The money server 1800 transmits transaction data for updating the ledger to the host device 2000.
(9) The host device 2000 updates the ledger according to the transaction data received from the money server 1800 and returns the transaction data indicating a result of updating of the ledger to the money server 1800.
(10) The money server 1800 issues a request for transfer of a value to the safe 1000.
(11) Transfer of a value, namely transfer of electronic money is executed between an IC card 1400 of the safe 1000 and the IC card 3200 of the user 3400.
(12) Finally, when transfer between the safe 1000 and the IC card 3200 is completed, verification of the transaction is executed by the money server 1800 to the load terminal 3000.

The safe 1000 according to the present invention used in the electronic money system using the IC card 3200 as described above has, for instance, trays 1200-1, 1200-2. Each of the trays 1200-1, 1200-2 has, for instance, 32 number of logical IC cards 1400 capable of logically realizing the same functions as that of the IC card 3200 with the help of software.

There are provided a plurality of trays and a plurality of IC cards in each tray because, it is not preferable from a viewpoint of security to store electronic money collectively in one storage section, and in addition, to make it possible, when requests for transaction are simultaneously issued from a plurality of load terminals, to process the requests concurrently.

Figure 2:
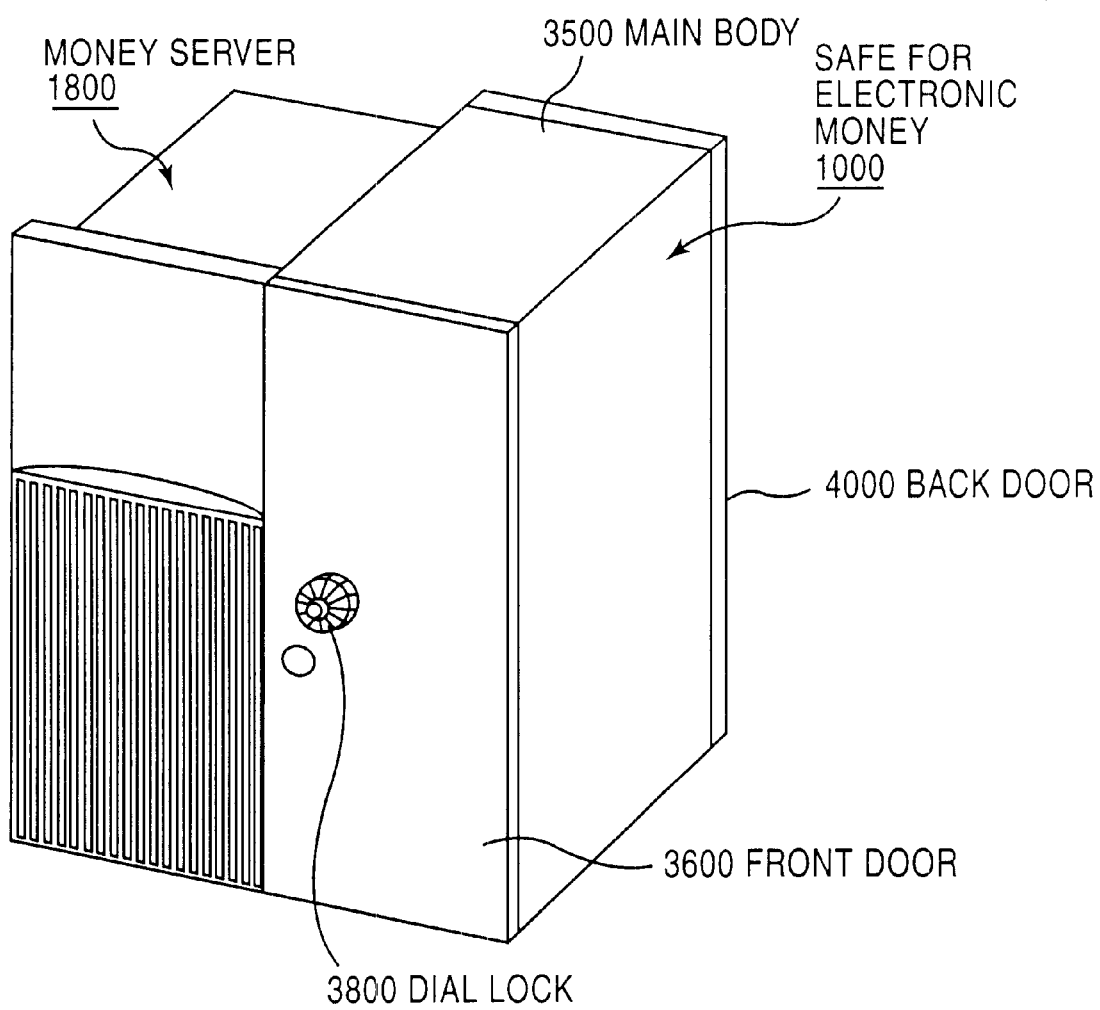
FIG. 2 is a view showing external appearance of a safe for electronic money and money server according to the present invention.

FIG. 2 shows an external appearance of the safe 1000 and money server 1800 according to the present invention. The safe 1000 according to the present invention is combined, for instance with the money server 1800 and has a main body 3500, a front door 3600 and a back door 4000. A dial lock 3800 is provided on the front door 3600, and the front door 3600 can be opened by setting a appropriate dial number. In addition, a cylinder lock is provided on the back door 4000.

Figure 3:
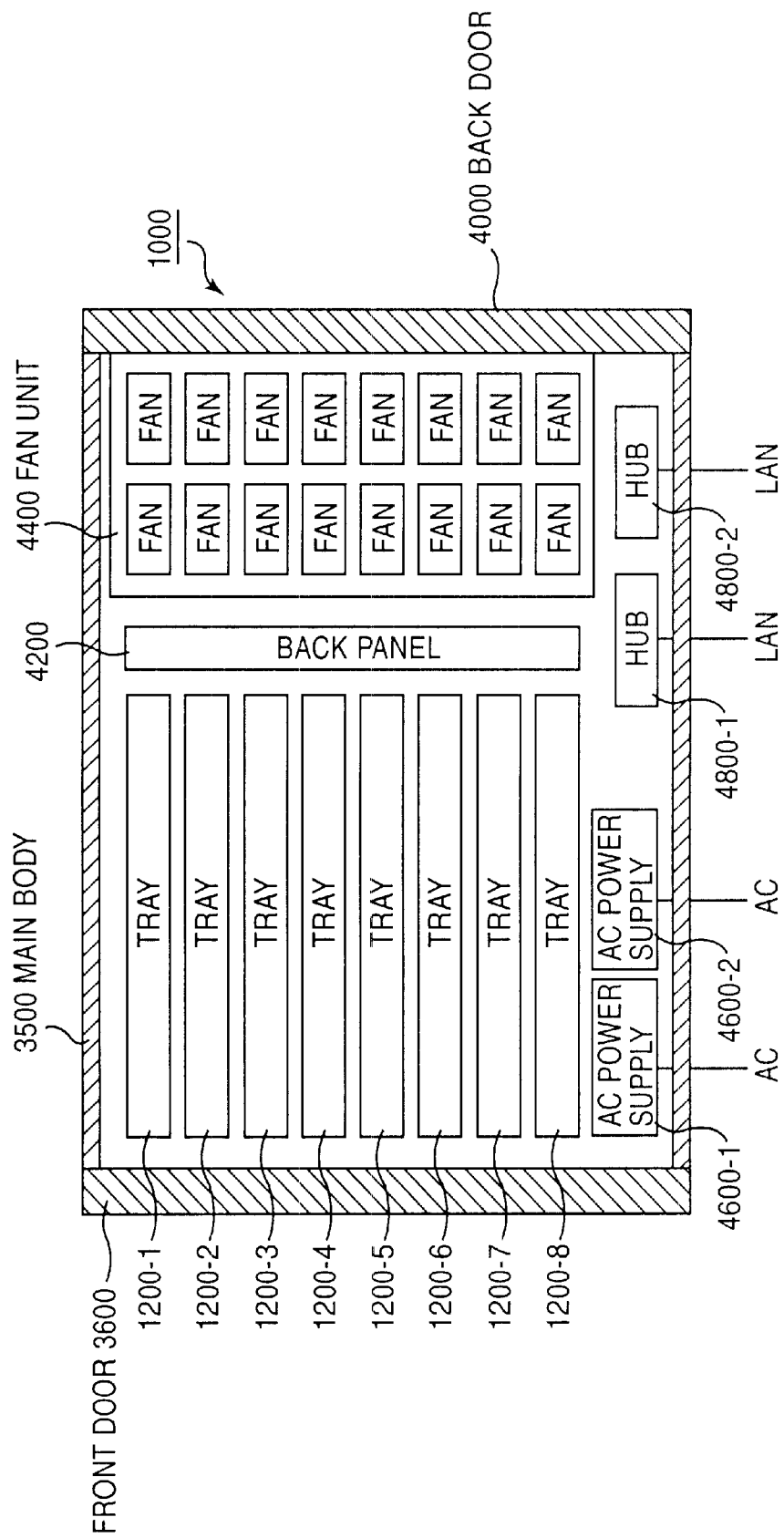
FIG. 3 is a cross-sectional view showing internal construction of the safe for electronic money shown in FIG. 2.

FIG. 3 is a cross-sectional view showing internal structure of the safe 1000. Main body 3500 of the safe 1000 is covered with an iron plate having a thickness of, for instance, 13 mm. The front door 3600 is provided in the front side and the back door 4000 is provided in the rear side. For instance, 8 units of trays 1200-1 to 1200-8 can be incorporated inside the main body 3500. A back panel 4200 as a common circuit board is provided for the trays 1200-1 to 1200-8.

Provided at the rear side of the back panel 4200 is a fan unit 4400 having two fans corresponding to each of the trays 1200-1 to 1200-8. Duplexed power units 4600-1, 4600-2 for AC power supply and duplexed hubs 4800-1, 4800-2 for LAN are provided at the bottom of the main basic body 3500.

Figure 4:
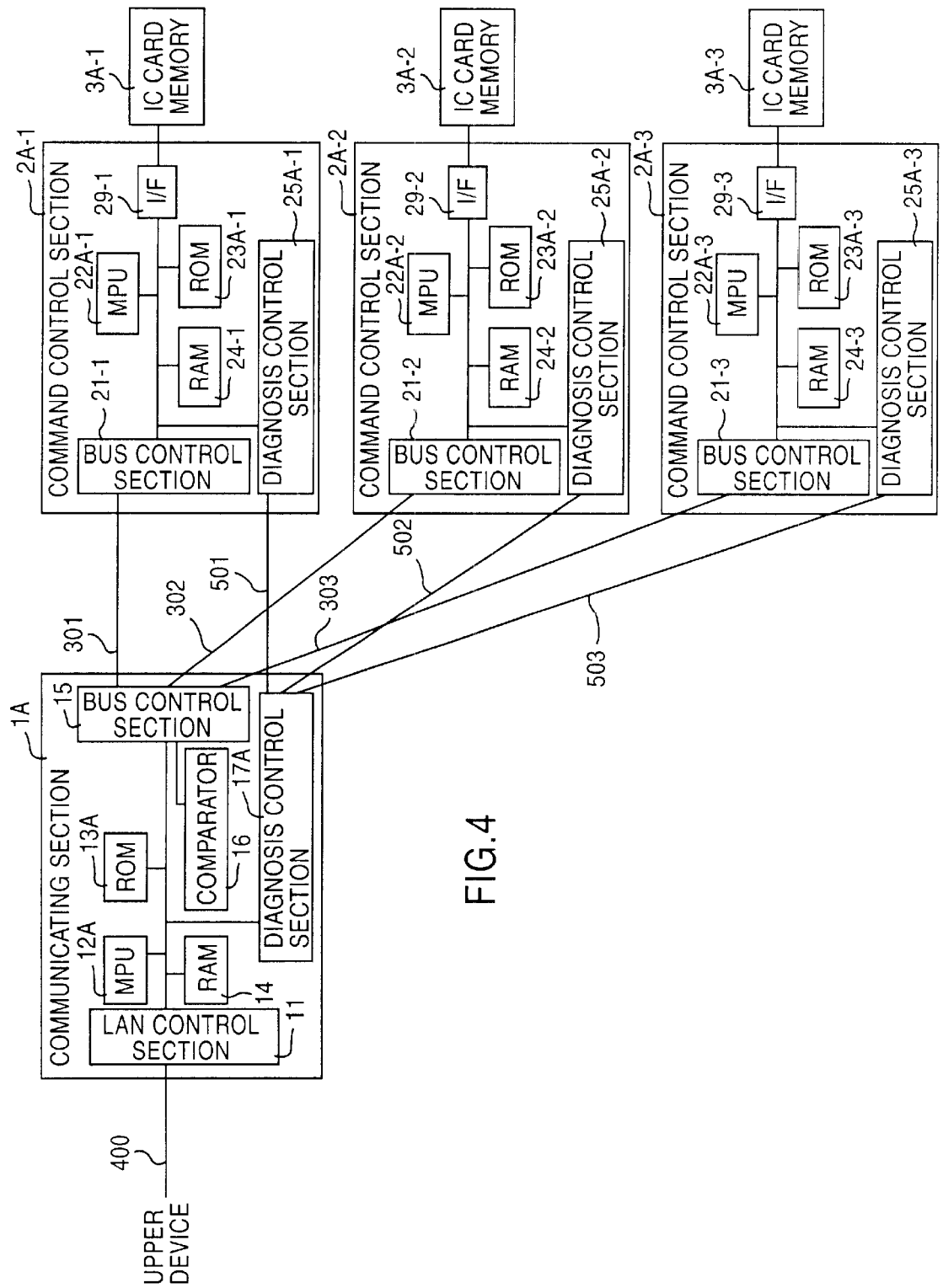
FIG. 4 is a block diagram showing one example of configuration of a safe for electronic money according to Embodiment 1 of the present invention.

FIG. 4 is a block configuration diagram showing the tray 1200-1 as a representative of the 8 trays accommodated in the safe 1000 shown. Tray 1200-1 comprises a communicating section 1A and, for instance, a triplexed value control section.

The value control section comprises three command control sections 2A-1, 2A-2, 2A-3 and, IC card memories 3A-1, 3A-2, 3A-3 connected to the command control sections 2A-1, 2A-2, 2A-3 respectively. The IC card memories 3A-1, 3A-2, 3A-3 are non-volatile memories each for storing therein electronic money indicating a value of currency with electronic information.

The command control section 2A-1 has an interface (shown as I/F in the figure) 29-1 and the IC card memory 3A-1 is connected to this interface 29-1. Similarly, the command control sections 2A-2, 2A-3 have interfaces 29-2, 29-3 respectively and the IC card memories 3A-2, 3A-3 are connected to these interfaces 29-2, 29-3 respectively.

The command control sections 2A-1 to 2A-3 logically realize control functions for a plurality of IC cards by concurrently executing commands to the IC card memories 3A-1 to 3A-3. Thus, when changing the encrypt processing used for security of electronic money, the need for physically exchanging a number of IC cards is eliminated and work can be executed quite easily.

The communicating control section 1A and the command control section 2A-1 are connected to each other through the bus interface 301 and diagnosis check path 501. Similarly, the communicating section 1A and the command control section 2A-2 are connected through the bus interface 302 and diagnosis check path 502, while the communicating section 1A and command control section 2A-3 are connected through the bus interface 303 and diagnosis check path 503.

The communicating section 1A comprises, for instance, a LAN control section 11, a MPU 12A, a ROM 13A, a RAM 14, a bus control section 15 a comparator 16 and a diagnosis control section 17A. The LAN control section 11 is based on, for instance, 100 Mbit/s 100BASE-TX standard. This LAN control section 11 is connected to an upper device not shown herein, namely a money server via a bus interface 400 as an upper interface and executes communications according to the TCP/IP protocol. The MPU 12A is a processor which controls the LAN control section 11 and the triplexed value control section. A program for the MPU 12A is stored in the ROM 13A and a RAM 14 is provided as a work memory.

The bus control section 15 controls data transfer with the command control sections 2A-1, 2A-2, 2A-3 via the bus interfaces 301, 302, 303 respectively. The comparator 16 compares data sent from the command control sections 2A-1, 2A-2, 2A-3 under controls by the bus control section 15 to each other. The diagnosis control section 17A sends a diagnosis command to the command control sections 2A-1, 2A-2, 2A-3 via the diagnosis check paths 501 to 503 respectively and also receives a result of diagnosis for diagnosing the triplexed value control section.

The command control section 2A-1 comprises, a bus control section 21-1, a MPU 22A-1, a ROM 23A-1, a RAM 24-1, a diagnosis control section 25A-1 and an interface 29-1. The bus control section 21-1 controls data transfer to the corresponding command control section 2A-1 via the bus interface 301. The MPU 22A-1 works as a processor for executing command processing. A program for this MPU 22A-1 is stored in the ROM 23A-1 and the RAM 24-1 is provided as a work memory. The diagnosis control section 25A-1 executes the command processing according to a diagnosis command sent via the diagnosis check path 501 from the communicating section 1A and returns a result of the diagnosis via the diagnosis check path 501 to the communicating section 1A.

Similarly, the command control section 2A-2 comprises, a bus control section 21-2, a MPU 22A-2, a ROM 23A-2, a RAM 24-2, a diagnosis control section 25A-2 and an interface 29-2. The bus control section 21-2 controls data transfer to the command control section 2A-2 via the bus interface 302. The MPU 22A-2 works as a processor for executing the command processing.

A program for this MPU 22A-2 is stored in the ROM 23A-2 and the RAM 24-2 is provided as a work memory. The diagnosis control section 25A-2 executes a diagnosis command sent via the diagnosis check path 502 from the communicating section 1A and returns a result of the diagnosis via the diagnosis check path 502 to the communicating section 1A.

Similarly the command control section 2A-3 comprises, a bus control section 21-3, a MPU 22A-3, a ROM 23A-3, a RAM 24-3, a diagnosis control section 25A-3 and an interface 29-3. The bus control section 21-3 controls data transfer to the corresponding command control section 2A-3 via the bus interface 303. The MPU 22A-3 works as a processor for executing command processing. A program for this MPU 22A-3 is stored in the ROM 23A-3 and the RAM 24-3 is provided as a work memory. The diagnosis control section 25A-3 executes command processing according to a diagnosis command sent via the diagnosis check path 503 from the communicating section 1A and returns a result of the diagnosis via the diagnosis check path 503 to the communicating section 1A.

Figure 5:
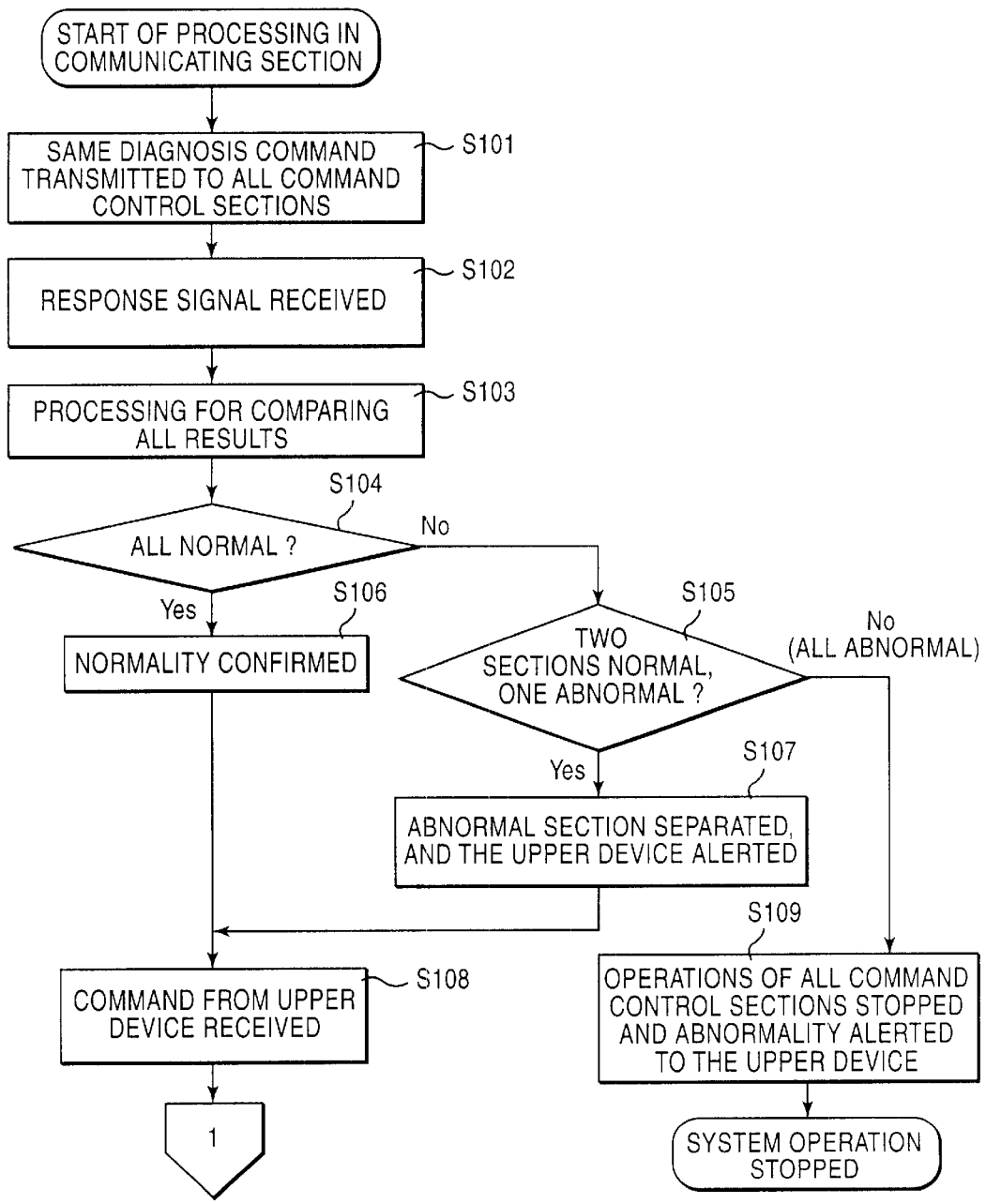
FIG. 5 is a flow chart illustrating operations in the communicating section in Embodiment 1.
Figure 6:
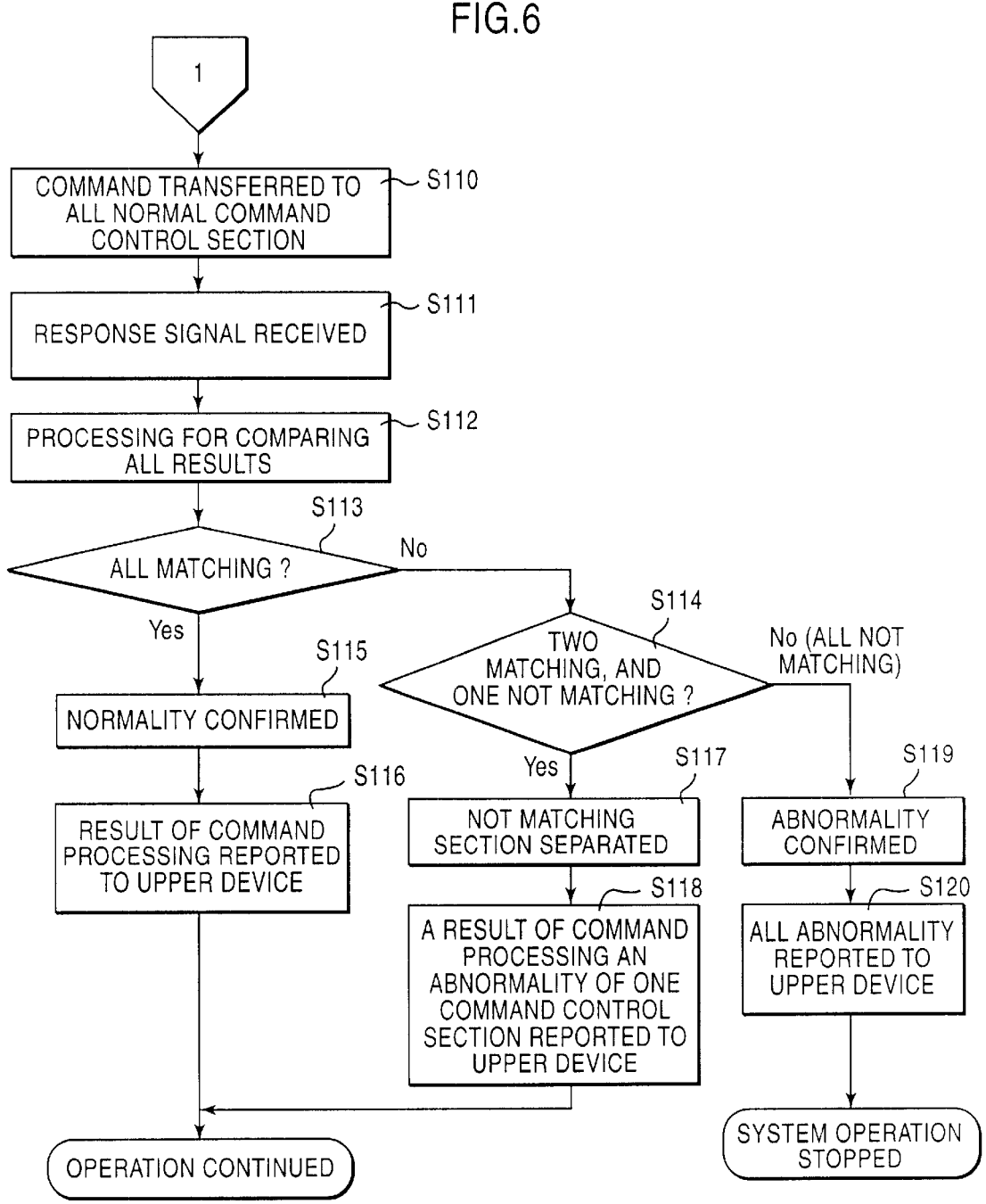
FIG. 6 is a flow chart illustrating operations in the communicating section in Embodiment 1.
Figure 7:
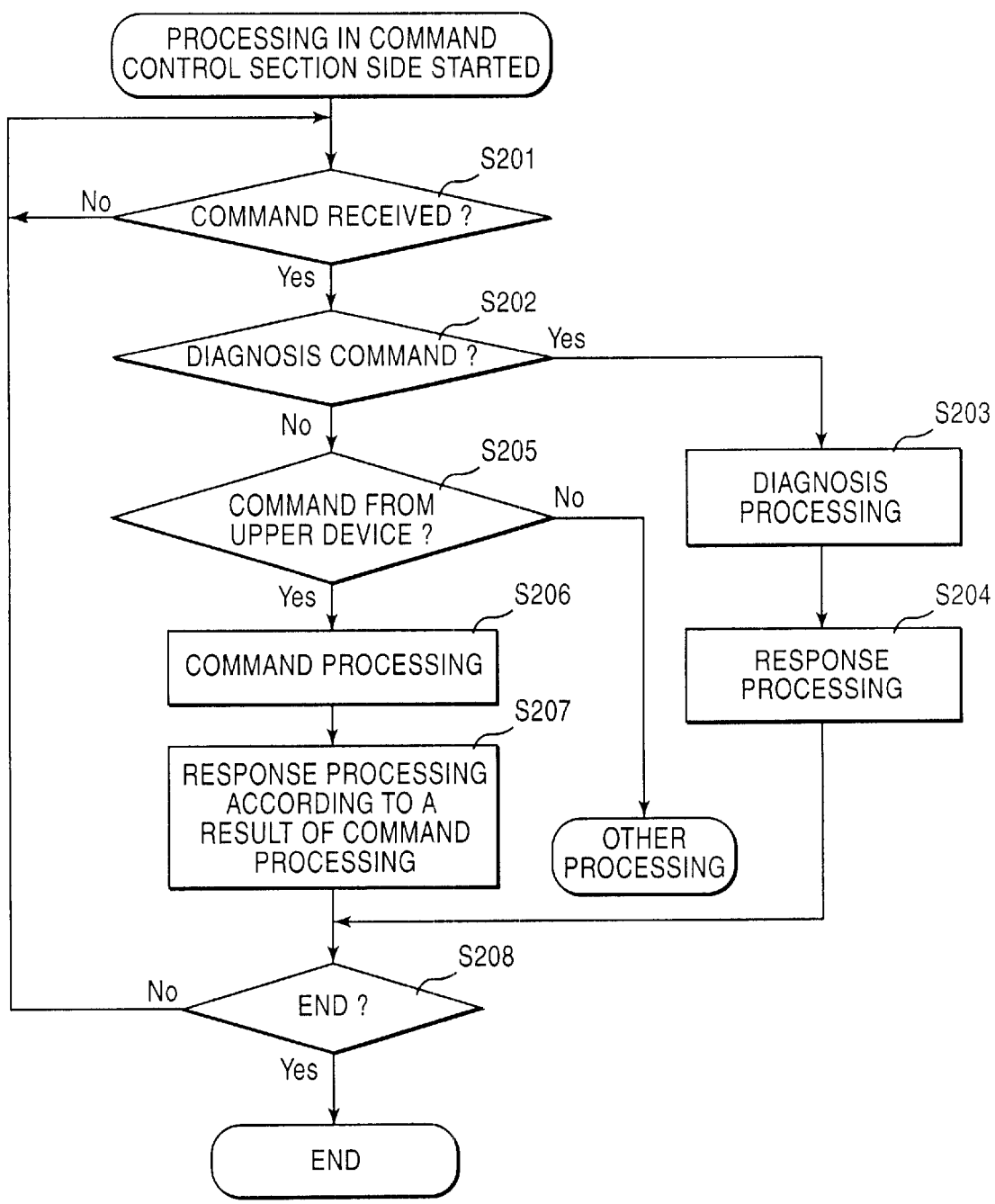
FIG. 7 is a flow chart illustrating operations in the command control section in Embodiment 1.

Next, description is made for operations. FIG. 5 and FIG. 6 are flow charts each illustrating operations in the communicating section, and FIG. 7 is a flow chart illustrating operations in the command control sections. At first, description is made for operations in the communicating section. In FIG. 5, same diagnosis commands are sent by the diagnosis control section 17A via the diagnosis check paths 501, 502, 503 to the corresponding command control sections 2A-1, 2A-2, 2A-3 respectively (step S101). When response signals are received from all of the command control sections 2A-1 to 2A-3 (step S102), all the responses, namely all results of diagnosis are compared to each other in the diagnosis control section 17A (step S103).

Based on a result of comparison, it is determined whether all of results of diagnosis are normal (step S104, YES), or two or more results of diagnosis are normal and one result of diagnosis is abnormal (step S105, YES), or whether all of results of diagnosis are abnormal or not (step S105, NO). When all of the results of diagnosis are normal (step S104, YES), the normality is confirmed and the normal state of the value control section is reported to the upper device (step S106). In this case, the value control section receives a command for command processing from the upper device through the bus interface 400 (Step S108).

When two or more of the results of diagnosis are normal and one result is abnormal (step S105, YES), the command control section diagnosed as abnormal is separated from the processing and abnormality of the command control section is alerted to the upper device (step S107). Also in this case, the value control section receives a command for command processing from the upper device through the bus interface 400 (step S108).

When all of the result of diagnosis are abnormal (step S105, NO), operation of all the command control sections is stopped and the abnormal state is reported to the upper device (step S109). In this case, operation of the communicating section 1A is also stopped.

When the command is received in the step S108, the command is transferred to all the normal command sections (step S110) of FIG. 6 and the communicating section 1A enters a state for waiting for a response. Then as command processing is executed, the command is transferred via the bus interfaces 301 to 303. When a response signal, namely a result of command processing is received via the bus interfaces 301 to 303 (step Sill), all the responses to the command, namely all of results of the command processing are compared to each other (step S112).

With such comparison, it is determined whether all of results of command processing are matching (step S113, YES), or that two or more of results of command processing are matching and one result of the command processing is not matching (step S114, YES), or that all of the results of command processing are not matching (step S114, NO). When all the results of command processing are matching (step S113, YES) then normality is confirmed (step S115) and the fact that all of the results of command processing in the value control section are matching is reported to the upper device (step S116). Then the processing is continued.

When two or more of results of command processing are matching and one result of command processing is not matching (step S114, YES), the command control section with a result of command processing therein detected as not matching is separated from the processing flow (step S117) and a result of command processing including abnormality of the command control section is reported to the upper device (Step S118). Then the processing is continued.

When all of the results of command processing are not matching (step S114, NO), the abnormal state of the value control section is confirmed (step S119) and operation of all the command control sections is stopped. The abnormal state is reported to the upper device (step S120). In this case, operation of the communicating section 1A is stopped.

In association with the processing in the communicating section 1A, the following processing is executed in the command control sections 2A-1 to 2A-3. Actually the MPU and the diagnosis control section execute processing discretely, but the processing is described as one processing flow in the following description. Processing executed in each of the command control sections 2A-1 to 2A-3 is common, so the description is made herein for representative processing. Namely, in FIG. 7, when a command is received (step S201, YES), it is determined whether the command is a diagnosis command (step S202, YES) or is it a command from the upper device (step S205, YES).

A command transferred via the bus interfaces 301 to 303 is a command from the upper device and, a command transferred via the diagnosis check paths 501 to 503 is a diagnosis command. When the received command is a diagnosis command (step S202, YES), diagnosis is executed according to the command (step S203) and result of the diagnosis is returned to the communicating section 1A ( step S204). If the processing is not to be terminated (step S208, NO), system control returns to step S201.

When the received command is a command from the upper device (step S205, YES), command processing is executed according to the received command (step S206) and a result of the command processing is returned to the communicating section 1A (step S207). On the other hand, when the received command is not a command from the upper device (step S205, NO), processing is executed according to the command. After the processing in step S207 is executed, if the processing is not to be terminated (step S208, NO) then the system control returns to step S201.

As described above, with Embodiment 1 of the present invention, a command from an upper device is transferred from the communicating section to the command control sections through the bus interfaces 301 to 303 the result of the command processing is transferred from the command control sections to the communicating section. Furthermore, a diagnosis command is transferred from the communicating section to the command control sections through the diagnosis check paths 501 to 503 and a result of the diagnosis is transferred therethrough from the command control sections to the communicating section. With this configuration, even if a path for command processing is illegally operated, the illegal operation can easily be detected from the diagnosis path, so that it is possible to prevent multiplex drawing by multiplexing control.

In addition, the path for command processing and the path for diagnosis are independent from each other, so that an illegal operation can be detected for each path.

In the Embodiment 1 described above, there is provided a diagnosis checking path dedicated to diagnosis of a value control section, but configuration of the present invention is not limited to that described above. Like in the Embodiment 2 described below, the diagnosis checking path may be omitted with the processing for diagnosis put under controls by a MPU. In this case, a command from an upper device and a diagnosis command are multiplexed. It should be noted that, in the Embodiment 2 the general configuration is the same as that in Embodiment 1, and that the same reference numerals are assigned to the same components and different reference numerals are used for different components.

Figure 8:
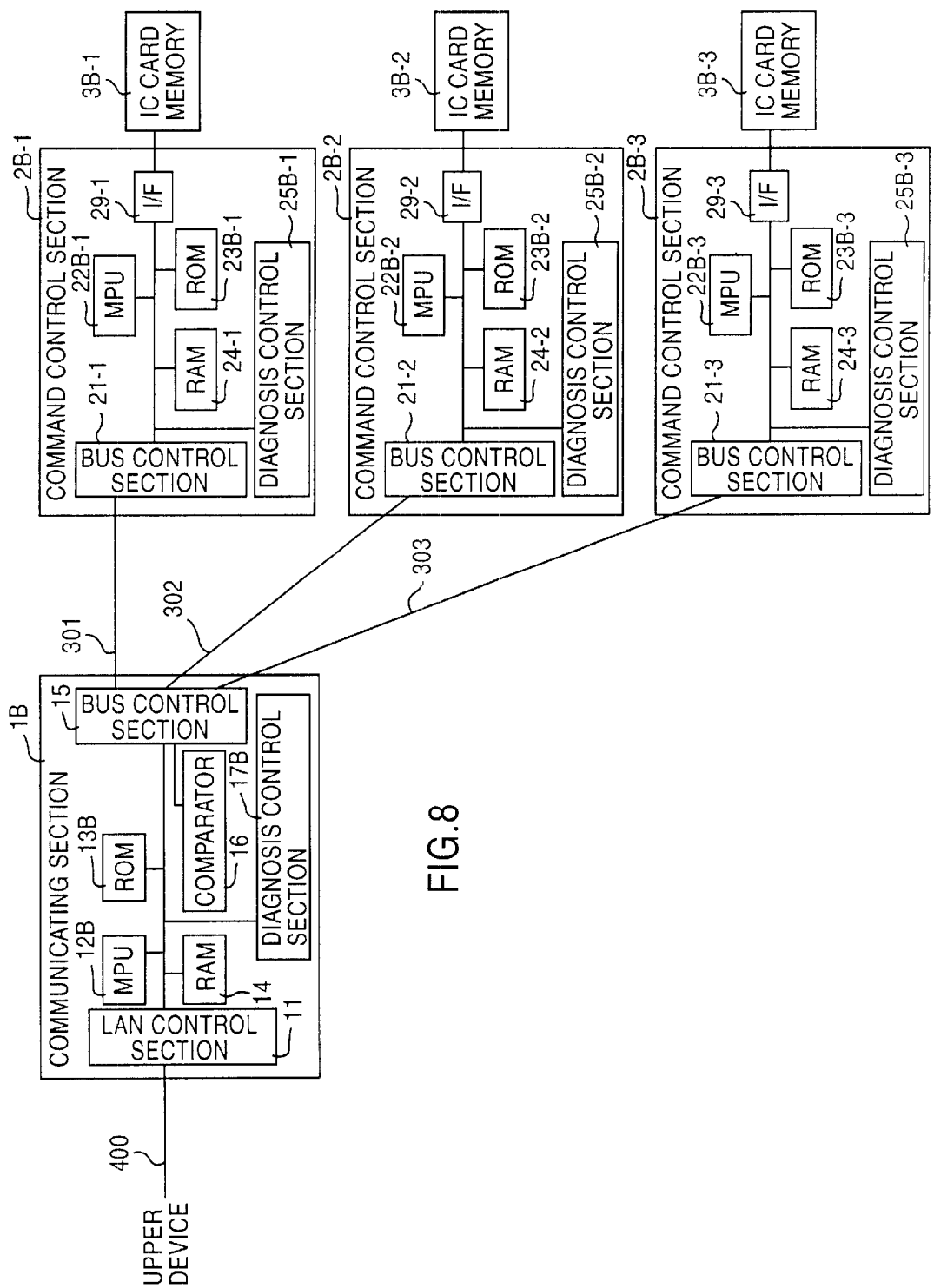
FIG. 8 is a block diagram showing one example of the safe for electronic money according to Embodiment 2 of the present invention.

FIG. 8 shows block configuration in Embodiment 2 represented by the tray 1200-1 which is one of 8 trays accommodated in the safe 1000 shown in FIG. 3. The tray 1200-1 comprises, as shown in FIG. 8, a communicating section 1B and, for instance, a triplexed value control section.

The triplexed value control section comprises three command control sections 2B-1, 2B-2 and 2B-3 and IC card memories connected to each command control 2B-1, 2B-2 and 2B-3. The IC card memories 3B-1, 3B-2, 3B-3 are non-volatile memories each for storing therein electronic money indicating a value of currency with electronic data.

The communicating section 1B and command control section 2B-1 are connected only with a bus interface 301. Similarly, the communicating section 1B and command control section 2B-2 are connected to each other only with a bus interface 302, and the communicating section 1B and command control section 2B-3 are connected only with a bus interface 303.

The communicating section 1B comprises, a LAN control section 11, a MPU 12B, a ROM 13B, a RAM 14, a bus control section 15, a comparator 16 and a diagnosis control section 17B. The MPU 12B differs from the MPU 12A of Embodiment 1 in that, it functions as a processor for controlling the LAN control section 11, controlling the triplexed value control section, and also controlling the processing for diagnosis. A program for this MPU 12B is stored in the ROM 13B. The bus control section 15 transfers a command and a response of the diagnosis through the bus interfaces 301, 302, 303 and the diagnosis control section 17B executes diagnosis under controls by the MPU 12B.

The command control section 2B-1 comprises, a bus control section 21-1, a MPU 22B-1, a ROM 23B-1, a RAM 24-1, a diagnosis control section 25B-1 and an interface 29-1. The MPU 22B1 differs from in the MPU 22A-1 of Embodiment 1 in that, it functions as a processor for executing command processing as well as for controlling the diagnosis control section 25B-1. A program for this MPU 22B-1 is stored in the ROM 23B-1. The diagnosis control section 25B-1 executes command processing according to a diagnosis command sent via the bus interface 301 from the communicating section 1B under controls by the MPU 22B-1 and returns a result of the diagnosis via the bus interface 301 to the communicating section 1B.

Similarly, the command control section 2B-2 comprises, a bus control section 21-2, an MPU 22B-2, a ROM 23B-2, a RAM 24-2, a diagnosis control section 25B-2 and an interface 29-2. The MPU 22B-2 differs from the MPU 22A-2 of Embodiment 1 in that, it functions as a processor for executing command processing and controlling the diagnosis control section 25B-2. A program for this MPU 22B-2 is stored in the ROM 23B-2. The diagnosis control section 25B-2 executes command processing according to a diagnosis command sent via the bus interface 302 from the communicating section 1B and returns a result of this diagnosis via the bus interface 302 to the communicating section 1B.

Similarly, the command control section 2B-3 comprises, a bus control section 21-3, a MPU 22B-3, a ROM 23B-3, a RAM 24-3, a diagnosis control section 25B-3 and an interface 29-3. The MPU 22B-3 differs from the MPU 22A-3 of Embodiment 1 in that, it functions as a processor for executing command processing and controlling the diagnosis control section 25B-3. A program for this MPU 22B-3 is stored in the ROM 23B-3. The diagnosis control section 25B-3 executes command processing according to a diagnosis command sent via the bus interface 303 from the communicating section 1B under controls by the MPU 22B-3 and returns a result of the diagnosis via the bus interface 303 to the communicating section 1B.

Figure 9:
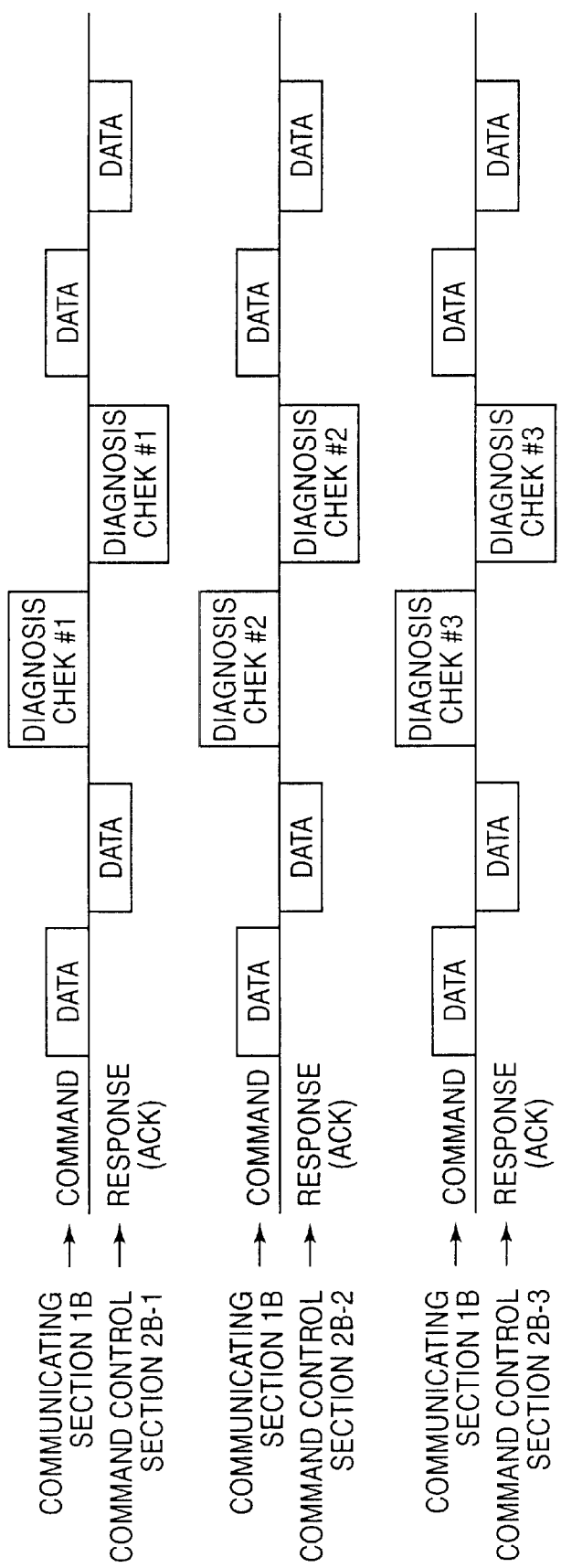
FIG. 9 is a timing chart of data transfer between the communicating section and command control sections in Embodiment 2.

Next, description is made for operations. FIG. 9 is a timing chart for transaction between the communicating section and command control section according to Embodiment 2. Timing between the communicating section 1B and command control section 2B-1 is shown in the upper row, that between the communicating section 1B and command control section 2B-2 is shown in the middle row, and that between the communicating section 1B and command control section 2B-3 is shown in the bottom row.

When data (command) is transferred from the communicating section 1B to the command control section 2B-1, a response (ACK) to the command is transferred from the command control section 2B-1 to the communicating section 1B. Furthermore, when a diagnosis command (diagnosis check #1) is transferred from the communicating section 1B to the command control section 2B-1, a response (ACK) to the command, namely a result of the diagnosis is transferred from the command control section 2B-1 to the communicating section 1B.

Similarly, when data (command) is transferred from the communicating section 1B to the command control section 2B-2, a response (ACK) to the command is transferred from the command control section 2B-2 to the communicating section 1B. Furthermore, when a diagnosis command (diagnosis check #2) is transferred from the communicating section 1B to the command control section 2B-2, a response (ACK) to the command, namely a result of the diagnosis is transferred from the command control section 2B-2 to the communicating section 1B.

Similarly, when data (command) is transferred from the communicating section 1B to the command control section 2B-3, a response (ACK) to the command is transferred from the command control section 2B-3 to the communicating section 1B. Furthermore, when a diagnosis command (diagnosis check #3) is transferred from the communicating section 1B to the command control section 2B-3, a response to the command (ACK), namely a result of the diagnosis is transferred from the command control section 2B-3 to the communicating section 1B.

With the example described above, transfer of a diagnosis command and return of the response between the communicating section 1B and each of the command control sections 2B-1 to 2B-3 are executed at the same timing.

As described above, with the Embodiment 2 of the present invention, a command from an upper device is transferred form the communicating section to the command control sections with a result of the command processing transferred from the command control sections to the communicating section, or diagnosis command is transferred from the communicating section to the command control sections with a result of the diagnosis transferred from the command control sections to the communicating section only with the bus interfaces 301 to 303. With this configuration, even if a path for command processing is illegally operated, the illegal operation can easily be detected during the data processing from a diagnosis path, so that it is possible to prevent multiplex drawing of a value by multiplexing control.

Also in the communicating section, command processing to and diagnosis of a plurality of command control sections are controlled at the same timing, so that it is possible to prevent an illegal operation by adjusting the timing.

In the Embodiment 2 above, diagnosis checking is executed at the same timing, but configuration of the present invention is not limited to that described above. Like in Embodiment 3 described hereinafter, timing for diagnosis may be timely displaced by each command control section. The general configuration of Embodiment 3 is the same as that of Embodiment 2 described above, and same reference numerals are used for the same components and different reference numerals are used for different components.

Figure 10:
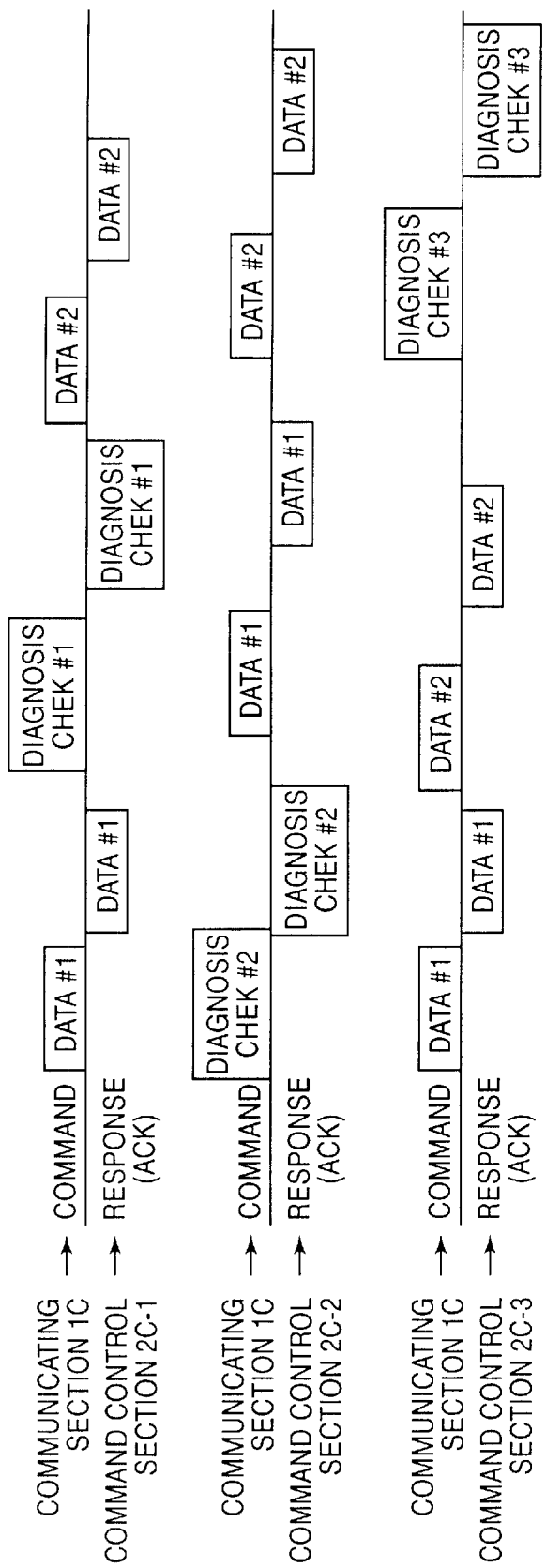
FIG. 10 is a timing chart of data transfer between the communicating section and command control sections in Embodiment 3 of the present invention.

Only the way of setting a timing is different from that in Embodiment 2, therefore, this aspect is only described below. FIG. 10 is a timing chart of data transfer between a communicating section and command control sections in Embodiment 3. In the following description of Embodiment 3, 1C indicates a communicating section equivalent to the communicating section 1B, and 2C-1, 2C-2, 2C-3 indicate command control sections equivalent to the command control sections 2B-1, 2B-2 and 2B-3 respectively. Timing between the communicating section 1C and command control section 2C-1 is shown in the top row, timing between the communicating section 1C and command control section 2C-2 is shown in the middle row, and timing between the communicating section 1C and command control section 2C-3 is shown in the bottom row.

When data (command) is transferred from the communicating section 1C to the command control section 2C-1, a response (ACK) to the command is transferred from the command control section 2C-1 to the communicating section 1C. Furthermore, when a diagnosis command (diagnosis check #1) is transferred from the communicating section to the command control section 2C-1, a response (ACK) to the response, namely a result of the diagnosis is transferred from the command control section 2C-1 to the communicating section 1C.

Similarly, when data (command) is transferred from the communicating section 1C to the command control section 2C-2, a response (ACK) to the command is transferred from the command control section 2C-2 to the communicating section 1C. Furthermore, a diagnosis command (Diagnosis check #2) is transferred from the communicating section 1C to the command control section 2C-2, a response (ACK) to the command, namely a result of the diagnosis is transferred from the command control section 2C-2 to the communicating section 1C.

Similarly, when data (command) is transferred from the communicating section 1C to the command control section 2C-3, a response (ACK) to the command is transferred from the command control section 2C-3 to the communicating section 1C. Furthermore, when a diagnosis command (diagnosis check #3) is transferred from the communicating section 1C to the command control section 2C-3, a response (ACK) to the command, namely a result of the diagnosis is transferred from the command control section 2C-3 to the communicating section 1C.

In the example described above, transfer of a diagnosis command from the communicating section 1C to each of the command control sections 2C-1 to 2C-3 and reception of a response to the command are executed at different timing respectively.

Figure 11:
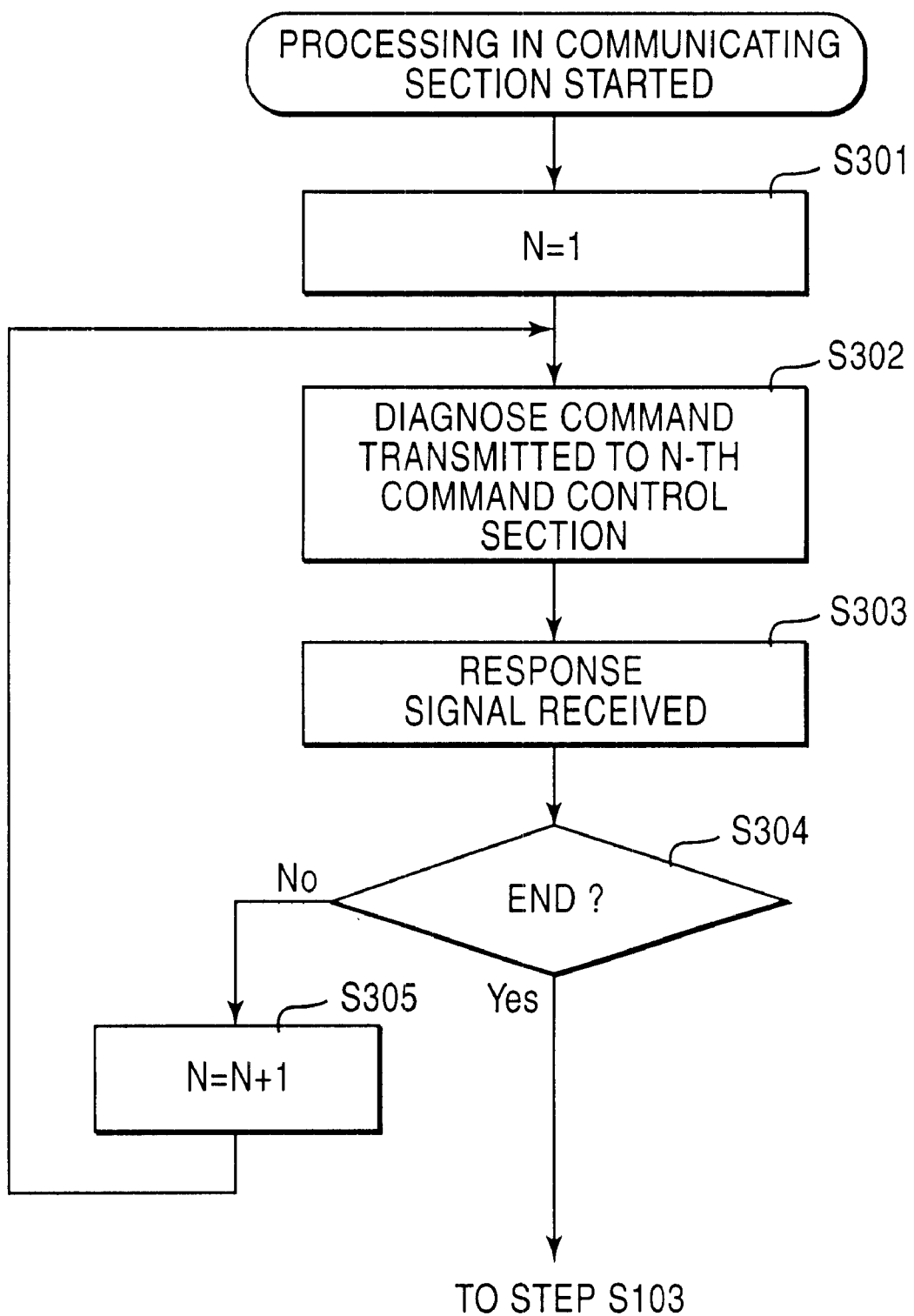
FIG. 11 is a flow chart showing main operations executed in the communicating section in Embodiment 3.

Next, description is made for a method of generating different timing. FIG. 11 is a flow chart for illustrating main operation in the communicating section in Embodiment 3. It is assumed herein that an arbitrary sequence for diagnosing the command control sections 2C-1 to 2C-3 is previously set. The following description is made on the assumption that diagnosis is made in the order of command control sections 2C-2, 2C-1, and then 2C-3.

At first, to diagnose the command control section with the highest priority in the order of diagnosis, "1" is set in N indicating an order of diagnosis thereof (step S301). Then, a prespecified diagnosis command is sent to the first command control section 2C-2 (step S302). When a response is returned f rom the command control section 2C-2, a result of the diagnosis is received (step S303). At this stage, as diagnosis of all command control sections has not been completed (step S304, NO), 1 is added to N (step S305), and then a prespecified diagnosis command is sent to the second command control section 2C-1 (step S302).

When a result of diagnosis is received from the command control section 2C-1, similarly a prespecified diagnosis command is transferred to the third command control section 2C-3 and a result of the diagnosis is received therefrom. When diagnosis of all the command control sections has been completed (step S304, YES), system control shifts to the step S103 (FIG. 5) described above.

With Embodiment 3 of the present invention, in the communicating section, command processing to a plurality of command control sections is executed at different timing respectively, so that it is possible to prevent an illegal operation by adjusting timing.

In the Embodiment 2 above, one command control section is connected to each bus interface, but configuration of the present invention is not limited to this one. Like in Embodiment 4 described below, a configuration is allowable in which a plurality of command control sections are connected to one bus interface and diagnosis of the command control sections on the same bus interface is made in an arbitrary order. In the Embodiment 4 of the present invention general configuration is the same as that of Embodiment 2 described above, and same reference numerals are used for the same components and different reference numerals are used for different components.

Figure 12:
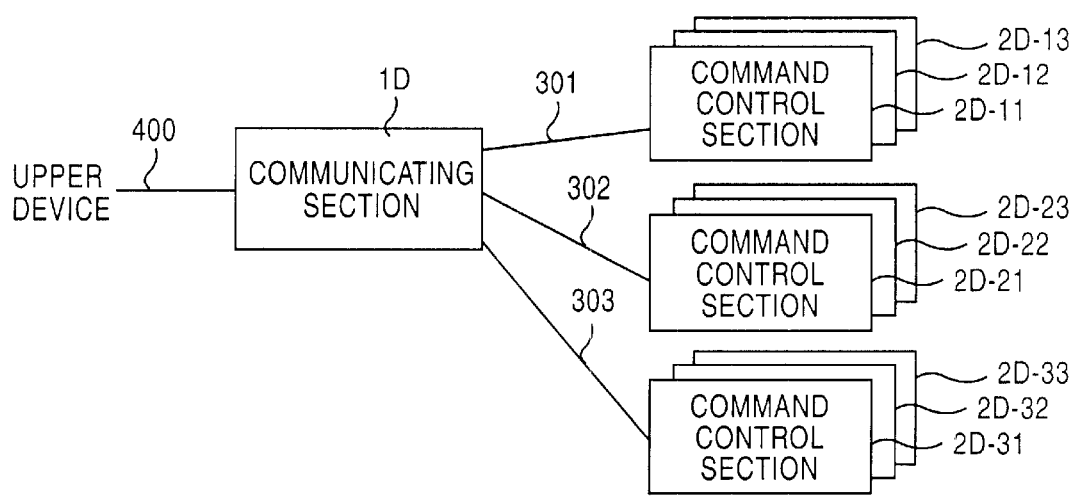
FIG. 12 is a block diagram showing one example of configuration of the safe for electronic money according to Embodiment 4 of the present invention.

At first, description is made for the configuration. FIG. 12 is a block diagram showing Embodiment 4, and in that figure a tray 1200-1 is shown as a representative of 8 trays accommodated in the safe 1000. In FIG. 12, a communicating section 1D has the same configuration as the configuration of communicating section 1B, therefore, description of its internal configuration is omitted herein.

Command control sections 2D-11, 2D-12, 2D-13 each executing the same processing are connected to the bus interface 301, command control sections 2D-21, 2D-22, 2D-23 each executing the same processing are connected to the bus interface 302 and command control sections 2D-31, 2D-32, 2D-33 each executing the same processing are connected to the bus interface 303. Command control sections 2D-11 to 2D-13, 2D-21 to 2D-23 and 2D-31 to 2D-33 have the same configuration as that of the command control sections 2B-1, 2B-2, 2B-3 respectively and description of their internal configuration is omitted herein.

Figure 13:
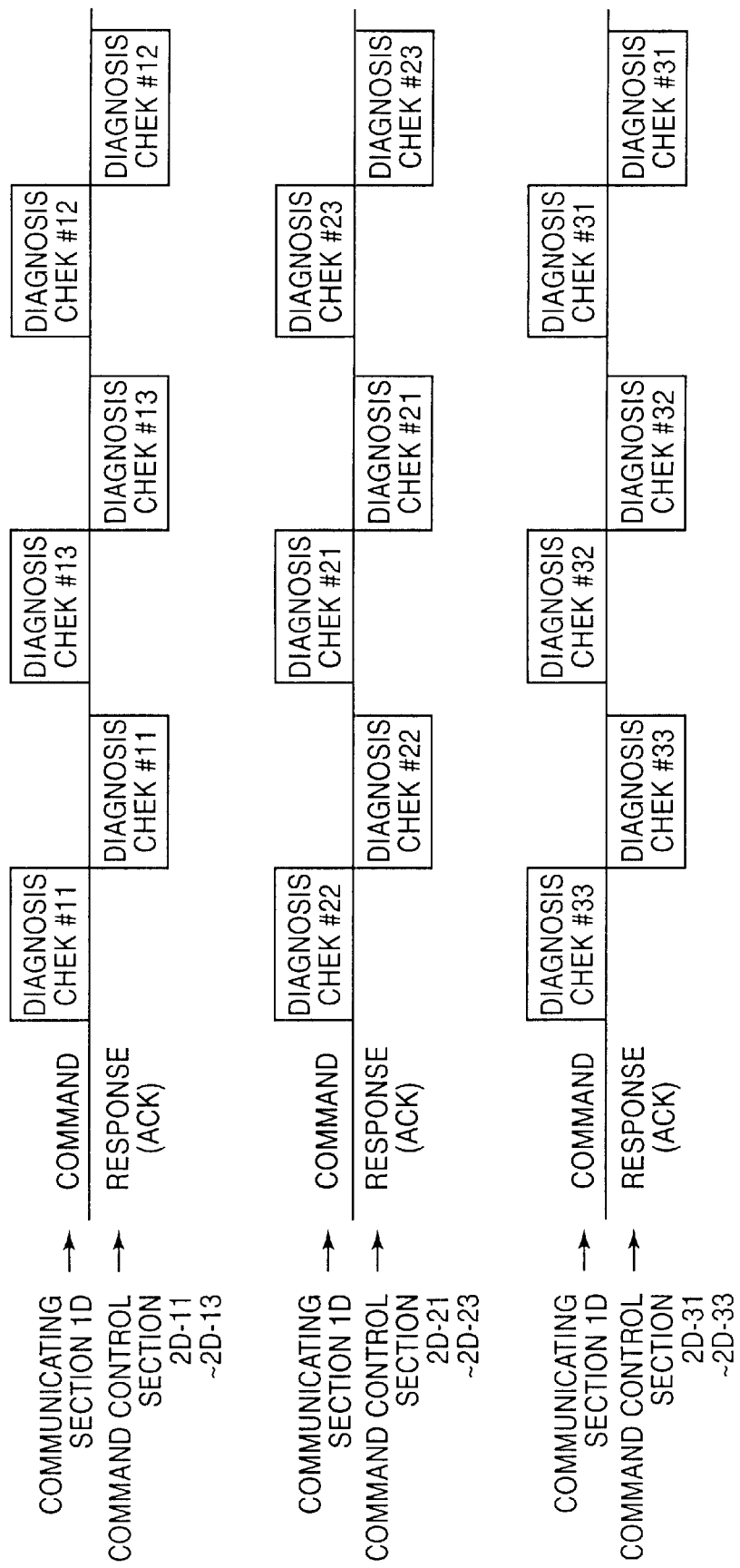
FIG. 13 is a timing chart of data transfer between the communicating section and command control sections in Embodiment 4.

Next, description is made for operations thereof. FIG. 13 is a timing chart of data transfer between a communicating section and a command control sections in Embodiment 4. In Embodiment 4, description of data is omitted, and description is made only for an operation for diagnosis. Timing between the communicating section 1D and command control sections 2D-11 to 2D-13 is shown in the top row, timing between the communicating section 1D and command control sections 2D-21 to 2D-23 is shown in the middle row, and timing between the communicating section 1D and command control sections 2D-31 to 2D-33 is shown in the bottom row.

In Embodiment 4, command control sections on the same bus interface are diagnosed in an arbitrary order. In FIG. 13, in a case of the bus interface 301, diagnosis is made in the order of the command control sections 2D-11, 2D-13 and then 2D-12. In a case of the bus interface 302, diagnosis is made in the order of the command control sections 2D-22, 2D-21 and then 2D-23. In a case of the bus interface 303, diagnosis is made in the order of command control sections 2D-33, 2D-32 and then 2D-31.

As for timing between bus interfaces, diagnosis of the command control sections 2D-11, 2D-22 and 2D-33 is made at the same timing, diagnosis of the command control sections 2D-13, 2D-21 and 2D-32 is made at the same timing and, diagnosis of the command control sections 2D-12, 2D-23 and 2D-31 is made at the same timing.

Order of diagnosis of the bus interfaces 301 to 303 and a combination of the same timing between the bus interface are only examples and can be changed arbitrarily.

As described above, with Embodiment 4, a plurality of command controls are connected to each bus interface, so that it is possible to prevent an illegal operation on each bus. Especially, in the communicating section 1D, timing for transfer is arbitrarily set among a plurality of command control sections connected to each bus interface, so that it is possible to improve capability of preventing an illegal operation as compared to a case where transfer is made in a fixed order. In the present invention, like in Embodiment 5 described below, to prevent electronic money from being copied, processing for encipherment may be executed during data transfer. In Embodiment 5 of the present invention general configuration is the same as that of Embodiment 2, and same reference numerals are used for the same components and different reference numerals are used for different components. It is assumed that diagnosis is not made in Embodiment 5.

Figure 14:
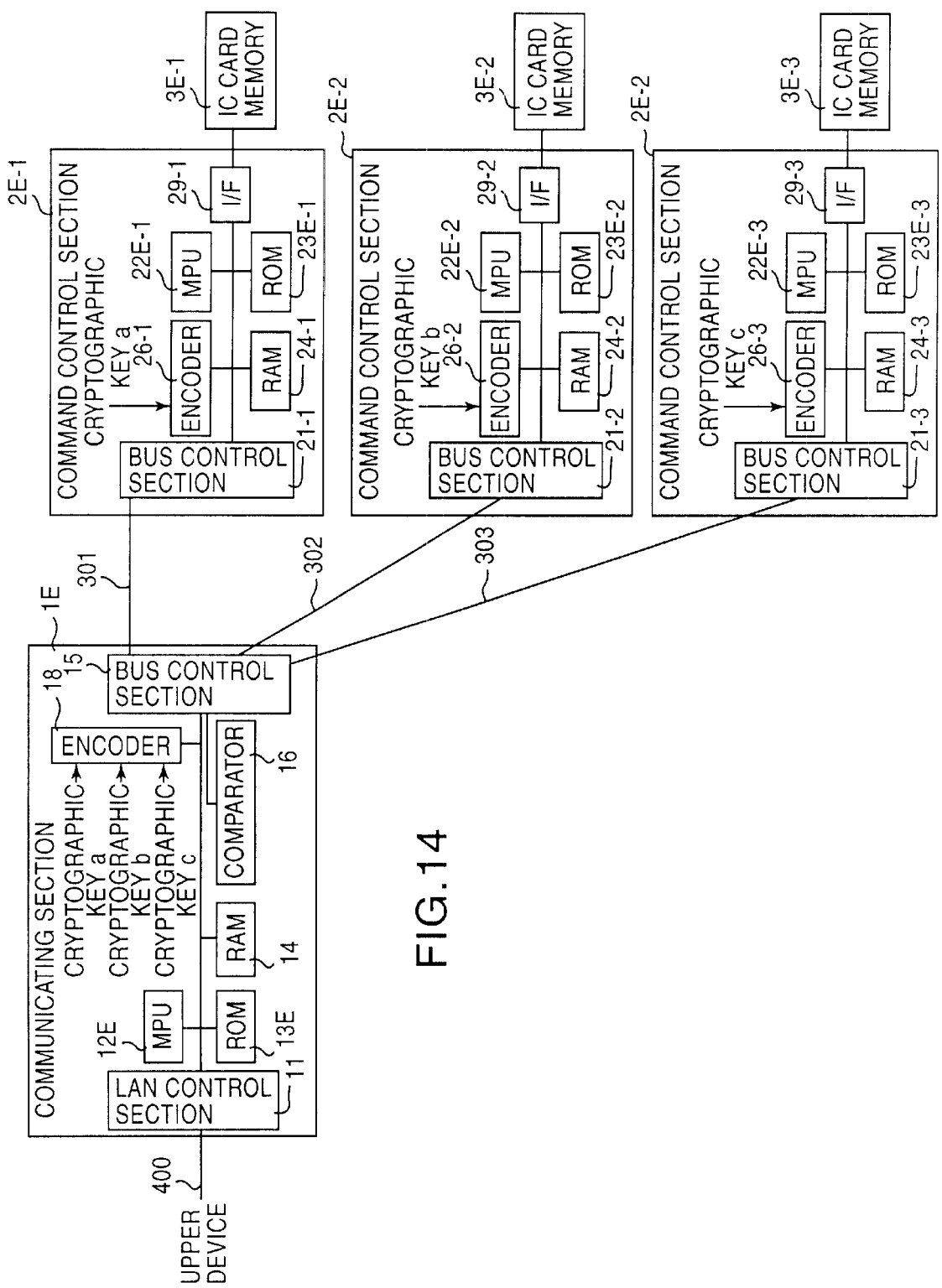
FIG. 14 is a block diagram showing one example of configuration of a safe for electronic money according to Embodiment 5 of the present invention.

At first, description is made for configuration thereof. FIG. 14 is a block diagram showing configuration of Embodiment 5, and in this figure a tray 1200-1 is shown as a representative of 8 trays accommodated in the safe for electronic money 1000 in FIG. 3. The tray 1200-1 comprises, as shown in FIG. 14, a communicating section 1E, and, for instance, a triplexed value control section.

The triplexed value control section comprises three command control sections 2E-1, 2E-2 and 2E-3 and IC card memories 3E-1, 3E-2, 3E-3 connected to the command control sections 2E-1, 2E-2 and 2E-3 respectively. The IC card memories 3E-1, 3E-2, 3E-3 are non-volatile memories each storing therein electronic money indicating a value of currency with electronic data.

The communicating section 1E and command control section 2E-lare connected only with the bus interface 301. Similarly, the communicating section 1E and command control section 2E-2 are connected only with the bus interface 302 and, the communicating section 1E and command control section 2E-3 are connected only with the bus interface 303.

The communicating section 1E comprises, a LAN control section 11, a MPU 12E, a ROM 13E, a RAM 14, a bus control section 15, a comparator 16 and an encoder 18. The MPU 12E differs from the MPU 12A of Embodiment 1 in that, it functions as a processor for controlling the LAN control section 11, the triplexed value control section and the encoder 18. A program for this MPU 12E is stored in the ROM 13E. The encoder 18 ciphers and deciphers data (command) using cryptographic keys a, b, c for encoding data for the command control sections 2E-1, 2E-2 and 2E-3 respectively.

The command control section 2E-1 comprised, a bus control section 21-1, a MPU 22E-1, a ROM 23E-1, a RAM 24-1, an encoder 26-1 and interface 29-1. The MPU 22E-1 differs from the MPU 22A-1 of Embodiment 1 in that, it functions as a processor for controlling command processing and the encoder 26-1.

A program for this MPU 22E-1 is stored in the ROM 23E-1. The encoder 26-1 executes processing for decoding and command processing according to data (ciphered command) sent via the bus interface 301 from the communicating section 1E, ciphers a result of the command processing and returns the result via the bus interface 301 to the communicating section 1E. When encoding and decoding data, the cryptographic key a corresponding to the command control section 2E-1 is used.

Similarly, the command control section 2E-2 comprises, a bus control section 21-2, a MPU 22E-2, a ROM 23E-2, a RAM 24-2, an encoder 26-2 and a bus interface 29-2. The MPU 22E-2 differs from the MPU 22A-2 of Embodiment 1 in that, it functions as a processor for controlling the command processing and the encoder 26-2.

A program for this MPU 22E-2 is stored in the ROM 23E-2. The encoder 26-2 executes processing for decoding and command processing according to data (ciphered command) sent via the bus interface 302 from the communicating section 1E, ciphers a result of the command processing and returns the result via the bus interface 302 to the communicating section 1E. When encoding and decoding, the cryptographic key b corresponding to the command control section 2E-2 is used.

Similarly, the command control section 2E-3 comprises, a bus control section 21-3, an MPU 22E-3, a ROM 23E-3, a RAM 24-3, an encoder 26-3 and an interface 29-3. The MPU 22E-3 differs from the MPU 22A-3 of Embodiment 1 in that, it functions as a processor for controlling the command processing and the encoder 26-3.

A program for this MPU 22E-3 is stored in the ROM 23E-3. The encoder 26-3 executes processing for decoding and command processing according to data (ciphered command) sent via the bus interface 303 from the communicating section 1E, ciphers a result of the command processing and returns the result via the bus interface 303 to the communicating section 1E. When encoding and decoding, the cryptographic key c corresponding to the command control section 2E-3 is used.

Figure 15:
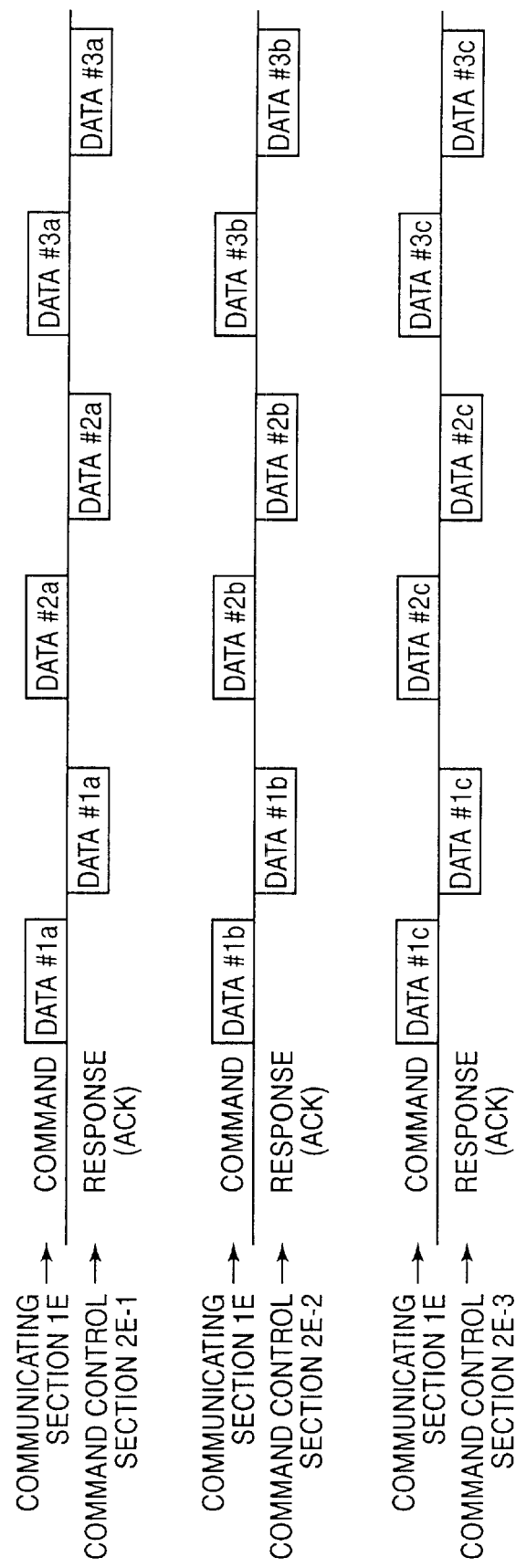
FIG. 15 is a timing chart of data transfer between the communicating section and command control sections in Embodiment 5.

Next, description is made for timing of command processing. FIG. 15 is a timing chart of data transfer between a communicating section and a command control sections in Embodiment 5. Timing between the communicating section 1E and command control section 2E-1 is shown in the top row, timing between the communicating section 1E and command control section 2E-2 is shown in the middle row, and timing between the communicating section 1E and command control section 2E-3 is shown in the bottom row.

When data (command ciphered with the cryptographic key a) is transferred from the communicating section 1E to the command control section 2E-1, a response (ACK) to the command also ciphered with the cryptographic key a is transferred from the command control section 2E-1 to the communicating section 1E. When data (command ciphered with cryptographic key b) is transferred from the communicating section 1E to the command control section 2E-2, a response (ACK) to the command also ciphered with the cryptographic key b is transferred from the command control section 2E-2 to the communicating section 1E. Similarly, when data (command ciphered with the cryptographic key c) is transferred from the communicating section 1E to the command control section 2E-3, a response (ACK) to the command also ciphered with the cryptographic key c is transferred from the command control section 2E-3 to the communicating section 1E.

Command processing is executed in the order of command (data) #1a, command #2a, command #3a between the communicating section 1E and command control section 2E-1. Command processing is executed in the order of command #1b, command #2b, command #3b between the communicating section 1E and command control section 2E-2. Command processing is executed in the order of command #1c, command #2c, command #3c between the communicating section 1E and command control section 2E-3. Specifically, at first, commands #1a, #1b, #1c are executed at the same timing, then commands #2a, #2b, #2b are executed at the same timing and, finally, commands #3a, #3b, #3c are executed at the same timing.

Figure 16:
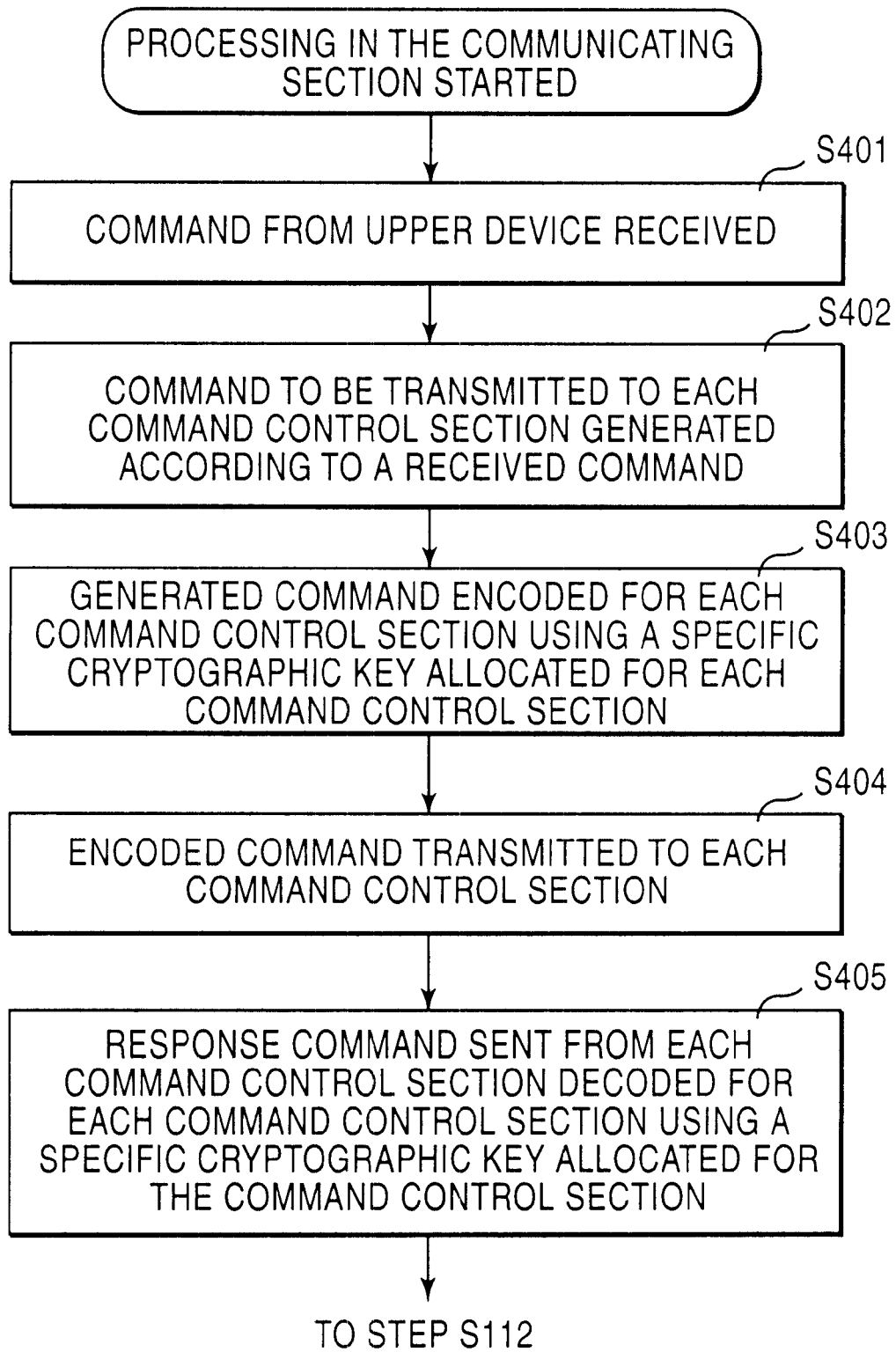
FIG. 16 is a flow chart for illustrating main operations executed in the communicating section in Embodiment 5.
Figure 17:
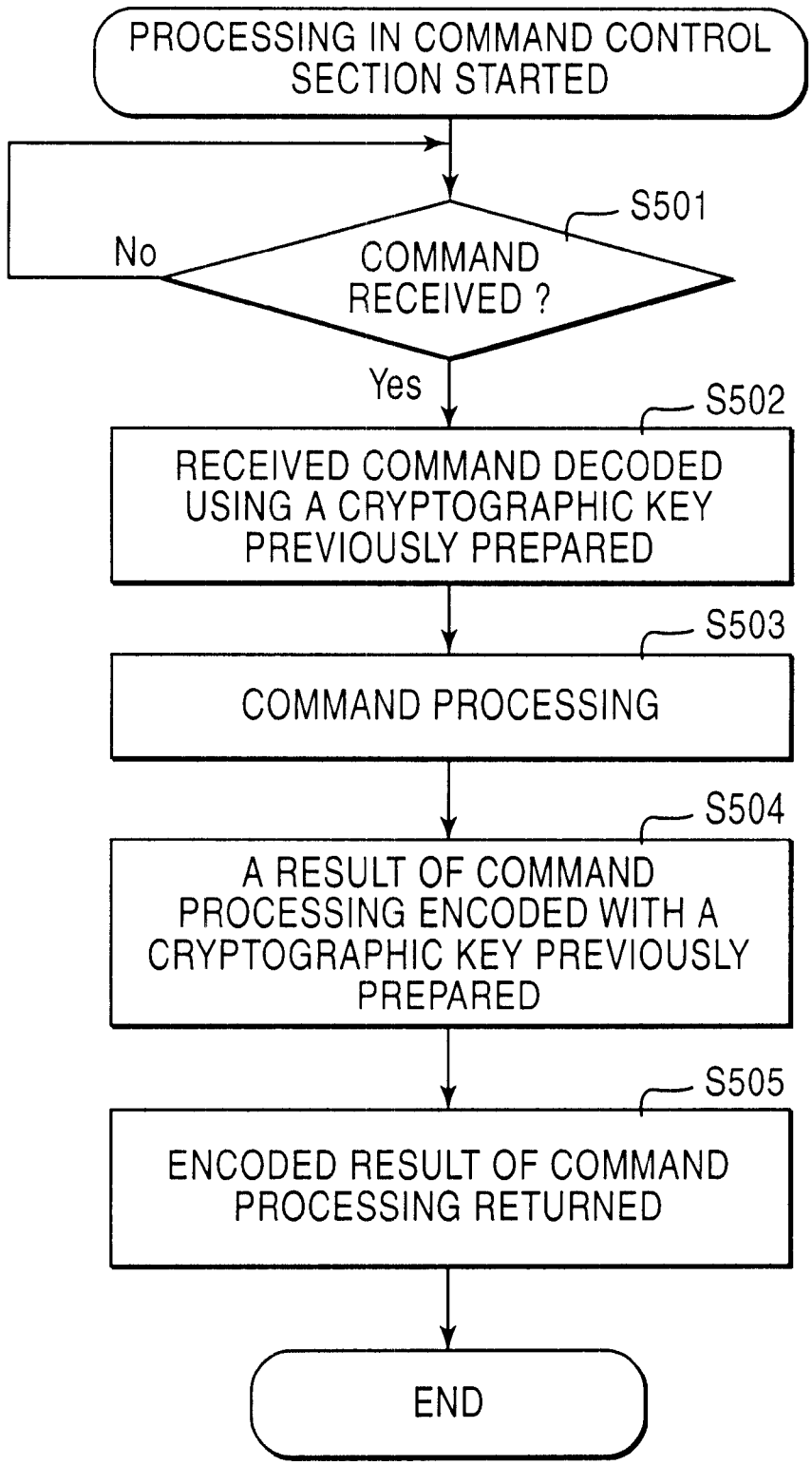
FIG. 17 is a flow chart for illustrating operations executed in the command control section in Embodiment 5.

Next, description is made for operations. FIG. 16 is a flow chart showing main operations executed in the communicating section according to Embodiment 5 and FIG. 17 is a flow chart showing operations executed in the command control section according to Embodiment 5. In FIG. 16, when a command from an upper device is received by the communicating section 1E (step S401), a command to be sent to each of the command control sections 2E-1, 2E-2 and 2E-3 are generated according to the received command (step S402).

The generated command is ciphered by the encoder 18 using the cryptographic keys a, b, c, so that data (ciphered commands) to be transmitted to the command control sections 2E-1, 2E-2 and 2E-3 are obtained (step S403). Three types of data obtained as described above, namely three ciphered commands are transmitted via the bus interfaces 301, 302, 303 to the corresponding command control sections 2E-1, 2E-2 and 2E-3 respectively (step S404).

Response signals, namely ciphered data indicating a result of command processing are sent from the command control sections 2E-1 to 2E-3, so that the received results of command processing are deciphered by the encoder 18 using the cryptographic keys a, b, c (step S405). Results of command processing in the command control sections 2E-1 to 2E-3 are obtained as described above. After this, system control shifts to step S112 in FIG. 6, and the processing described above is executed.

In each of the command control sections 2E-1 to 2E-3, processing is executed as shown in FIG. 17. When an ciphered command is received (step S501, YES), the command is deciphered using a prepared cryptographic key (step S502). Namely, the cryptographic key a is prepared in the command control section 2E-1 and the encoder 26-1 executes decoding using the cryptographic key a. Similarly, the cryptographic key b is prepared in the command control section 2E-2 and the encoder 26-2 executes decoding using the cryptographic key b. Similarly, the cryptographic key c is prepared in the command control section 2E-3 and the encoder 26-3 executes decoding using the cryptographic key c.

When decoding is finished, command processing is executed in the deciphered command (step S503), and a result of the command processing is ciphered using the cryptographic key a for the command control section 2E-1, the cryptographic key b for the command control section 2E-2, or the cryptographic key c for the command control section 2E-3 (step S504). The results of command processing ciphered as described above is returned to the communicating section 1E (step S505).

As described above, with Embodiment 5 of the present invention, the communicating section 1E executes encoding and decoding in communication with the command control sections using a specific cryptographic key allocated to each of the command control sections, while each of the command control sections executes encoding and decoding in communication with the communicating section 1E using a specific cryptographic key allocated to the command control section, so that security for transferred contents can be maintained in each command control section. It should be noted that, although a configuration not comprising a diagnosing function is described in Embodiment 5, the diagnosing function as that described in Embodiments 1 to 4 may be added thereto.

In the Embodiment 5 described above, a fixed cryptographic key is used for each command control section, but the configuration of the present invention is not limited to this. Security may be enhanced by selecting a cryptographic key at random for each command section like in Embodiment 6 of the present invention described below. A general configuration of Embodiment 6 is the same as that of the Embodiment 5, and same reference numerals are used for the same components and different reference numerals are used for different components. It is assumed that, diagnosis is not executed in Embodiment 6 also.

Figure 18:
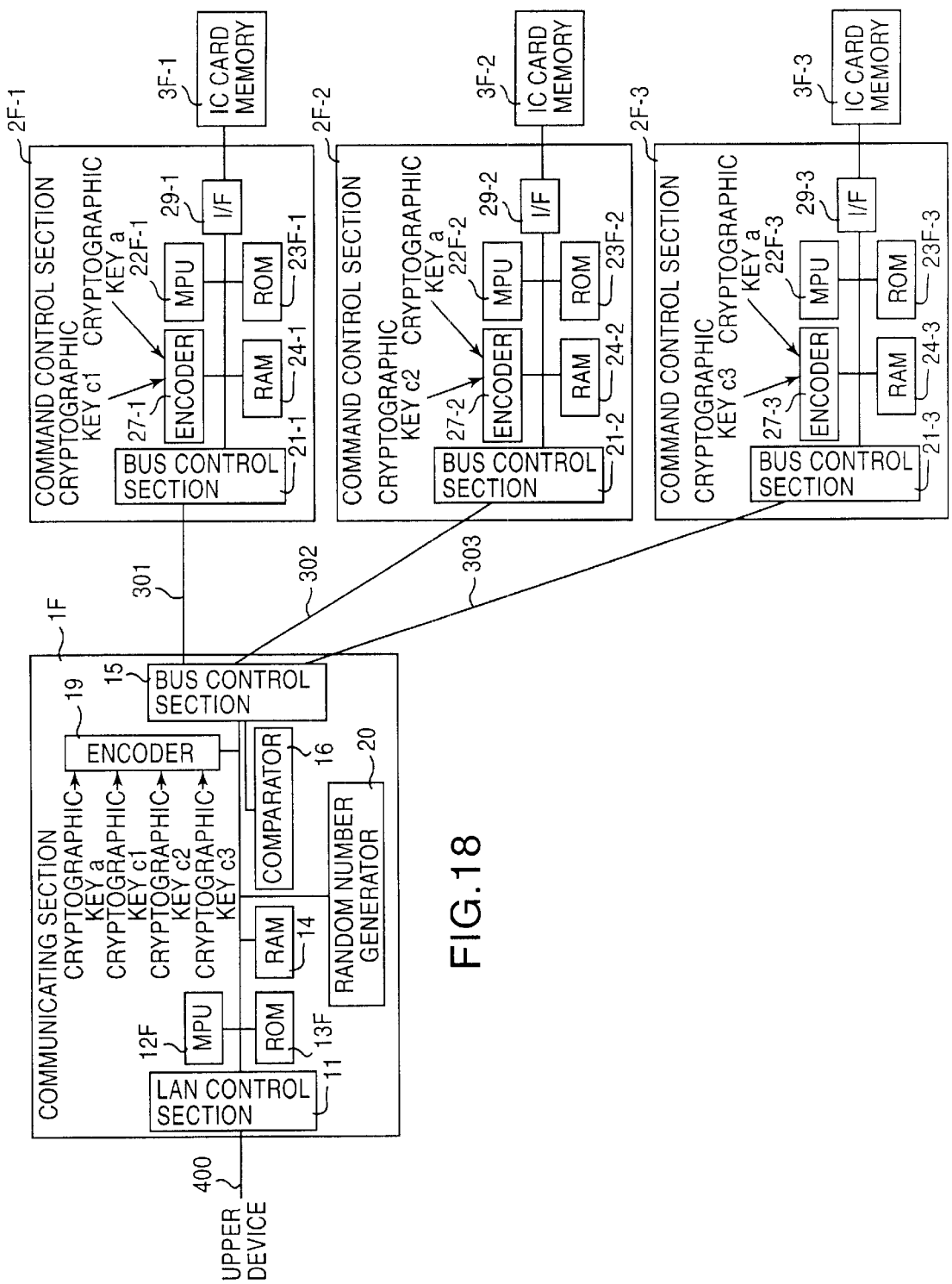
FIG. 18 is a block diagram showing one example of configuration of a safe for electronic money according to Embodiment 6 of the present invention.

At first description is made for the configuration. FIG. 18 is a block diagram showing general configuration in Embodiment 6, and in this figure the tray 12001-1 is shown as a representative of 8 trays accommodated in the safe 1000 shown in FIG. 3. The tray 1200-1 comprises, as shown in FIG. 18, a communicating section 1F and, for instance, a triplexed value control section.

The triplexed value control section comprises three command control sections 2F-1, 2F-2, 2F-3 and three IC card memories 3F-1, 3F-2, 3F-3 connected to each command control sections 2F-1, 2F-2, 2F-3 respectively. The IC card memories 3F-1, 3F-2, 3F-3 are non-volatile memories each for storing therein electronic money indicating a value of currency with electronic data.

The communicating section 1F and command control section 2F-1 are connected only with the bus interface 301. Similarly, the communicating section 1F and command control section 2F-2 are connected with the bus interface 302. The communicating section 1F and command control section 2F-3 are connected with the bus interface 303.

The communicating section 1F comprises, a LAN control section 11, a MPU 12F, a ROM 13F, a RAM 14, a bus control section 15, a comparator 16, an encoder 19 and a random number generator 20. The MPU 12F differs from in the MPU 12A of Embodiment 1 in that, it functions as a processor for controlling the LAN control section 11, triplexed value control section and encoder 19. A program for this MPU 12F is stored in the ROM 13F.

The encoder 19 executes encoding and decoding using the cryptographic keys $c_1$, $c_2$, $c_3$ for the command control sections 2F-1, 2F-2, 2F-3 respectively or a common key a. The random number generator 20 generates cryptographic keys for the command control sections 2F-1, 2F-2, 2F-3 at randomly. In FIG. 18, the cryptographic keys $c_1$, $c_2$, $c_3$ corresponding to the command control sections 2F-1, 2F-2, 2F-3 are shown in the communicating section 1F, and the states after respective cryptographic keys $c_1$, $c_2$, $c_3$ are transferred are shown in the command control sections 2F-1, 2F-2, 2F-3. It should be noted that the cryptographic keys $c_1$, $c_2$, $c_3$ are changed, for instance, to cryptographic keys $c_4$, $c_5$, $c_5$ by operating the random number generator 20.

The command control section 2F-1 comprises, for instance, a bus control section 21-1, a MPU 22F-1, a ROM 23F-1, a RAM 24-1, an encoder 27-1 and an interface 29-1.

The MPU 22F-1 differs from the MPU 22A-1 of Embodiment 1 in that, it functions as a processor for controlling command processing and the encoder 27-1.

A program for this MPU 22 is stored in the ROM 23F-1. The encoder 27-1 executes decoding and command processing according to data (ciphered command) sent via the bus interface 301 from the communicating section 1F, ciphers a result of the command processing and returned the ciphered data via the bus interface 301 to the communicating section 1F. When executing encoding and decoding, the cryptographic key $c_1$ specific to the command control section 2F-1 or the cryptographic key a commonly shared by all the command control sections is used.

Similarly, the command control section 2F-2 comprises, as shown in FIG. 18, a bus control section 21-2, a MPU 22F-2, a ROM 23F-2, a RAM 24-2, an encoder 27-2 and an interface 29-2.

The MPU 22F-2 differs from the MPU 22A-2 of Embodiment 1 in that, it functions as a processor for controlling the command processing and the encoder 27-2.

A program for this MPU 22F-2 is stored in the ROM 23F-2. The encoder 27-2 executes encoding and command processing according to data (ciphered command) sent via the bus interface 302 from the communicating section 1F, via the bus interface 302 to the communicating section 1F. When executing encoding and decoding, the cryptographic key $c_2$ specific to the command control section 2F-2 or the cryptographic key a commonly shared by all the command control sections is used.

Similarly, the command control section 2F-3 comprises, a bus control section 21-3, a MPU 22F-3, a ROM 23F-3, a RAM 24-3, an encoder 27-3 and an interface 29-3. The MPU 22F-3 differs from the MPU 22A-3 of Embodiment 1 in that, it functions as a processor for controlling command processing and the encoder 27-3.

A program for this MPU 22F-3 is stored in the ROM 23F-3. The encoder 27-3 executes decoding and command processing according to data (ciphered command) sent via the bus interface 303 from the communicating section 1F under controls by the MPU 22F-3 and, ciphers a result of the command processing and, returns a response via the bus interface 303 to the communicating section 1F. When executing encoding and decoding, the cryptographic key $c_3$ specific to the command control section 2F-3 or a cryptographic key a commonly shared by all the command control sections is used.

Figure 19:
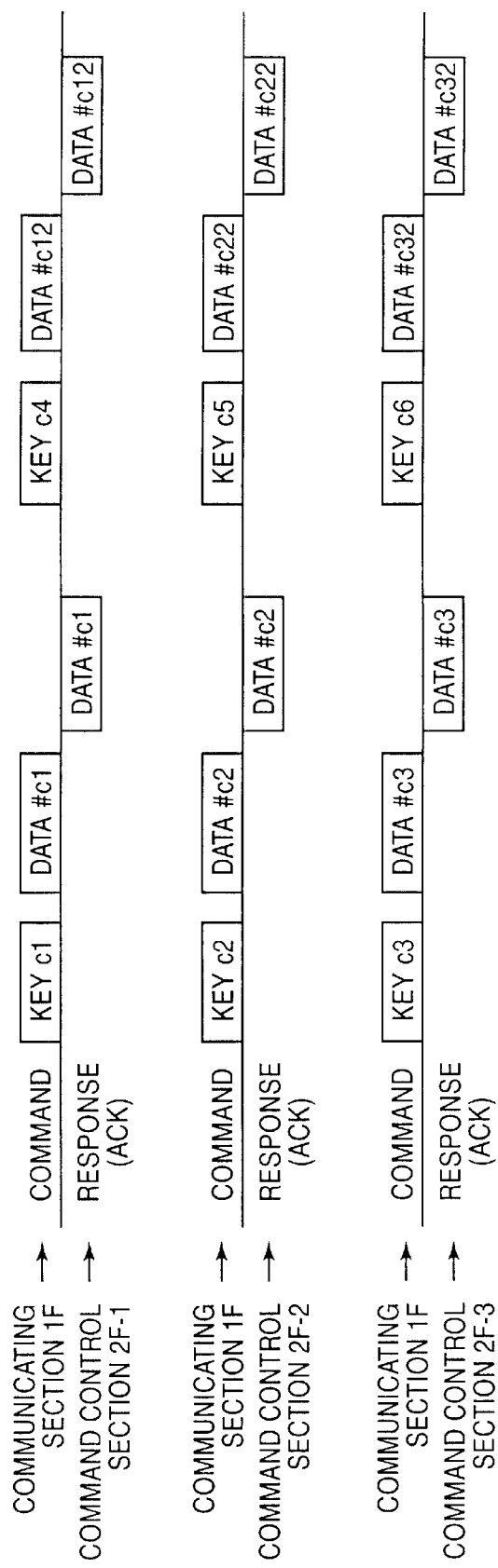
FIG. 19 is a timing chart of data transfer between the communicating section and command control sections in Embodiment 6.

Next, description is made for timing of command processing. FIG. 19 is a timing chart of data transfer between the communicating section and command control sections according to Embodiment 6. Timing between the communicating section 1F and command control section 2F-1 is shown in the top row, timing between the communicating section 1F and command control section 2F-2 is shown in the middle row, and timing between the communicating section 1F and the command control section 2F-3 is shown in the bottom row.

In data transfer between the communicating section and command control sections in Embodiment 6, at first cryptographic keys corresponding to the command control sections 2F-1 to 2F-3 generated at random are transferred from the communicating sections 1F, and cryptographic keys stored in the command control sections 2F-1 to 2F-3 are updated. Furthermore, a cryptographic key transferred to each of the command control sections 2F-1 to 2F-3 is ciphered with the specific cryptographic key a and, the cryptographic key transferred to each command control section is deciphered with the cryptographic key a. A command is ciphered or deciphered with the cryptographic keys allocated to the command control sections 2F-1 to 2F-3 respectively.

Specifically, the cryptographic key c1 ciphered with the cryptographic key a is transferred from the communicating section 1F to the command control section 2F-1. Similarly, the cryptographic key c2 ciphered with the cryptographic key a is transferred from the communicating section 1F to the command control section 2F-2, and the cryptographic key c3 ciphered with the cryptographic key a is transferred from the communicating section 1F to the command control section 2F-3.

At the next timing, data #c1 ciphered with the cryptographic key c1 is transferred from the communicating section 1F to the command control section 2F-1, and a response (ACK) also ciphered with the cryptographic key c1 is transferred from the command control section 2F-1 to the communicating section 1F. At the same timing, data #c2 ciphered with the cryptographic key c2 is transferred from the communicating section 1F to the command control section 2F-2, and a response (ACK) also ciphered with the cryptographic key c2 is transferred from the command control section 2F-2 to the communicating section 1F. Similarly, when data #c3 ciphered with the cryptographic key c2 is transferred from the communicating section 1F to the command control section 2F-3, a response (ACK) ciphered with the cryptographic key c3 is transferred from the command control section 2F-3 to the communicating section 1F.

Cryptographic keys c1, c2, c3 given to the command control sections 2F-1, 2F-2, 2F-3 change to the cryptographic keys c4, c5, c6 according to the next operation of the random number generator 20. Therefore, after execution of command processing, the cryptographic keys c4, c5, c6 are again transferred to the command control sections 2F-1, 2F-2 and 2F-3.

Then data #c12 ciphered with the cryptographic key c4 is transferred from the communicating section 1F to the command control section 2F-1, and a response (ACK) also ciphered with the cryptographic key c4 is transferred from the command control section 2F-1 to the communicating section 1F. At the same timing, data #c22 ciphered with the cryptographic key c5 is transferred from the communicating section 1F to the command control section 2F-2, and a response (ACK) also ciphered with the cryptographic key c5 is transferred from the command control section 2F-2 to the communicating section 1F. Similarly, when data #c32 ciphered with the cryptographic key c6 is transferred from the communicating section 1F to the command control section 2F-3 and a response (ACK) also ciphered with the cryptographic key c6 is transferred from the command control section 2F-3 to the communicating section 1F.

Figure 20:
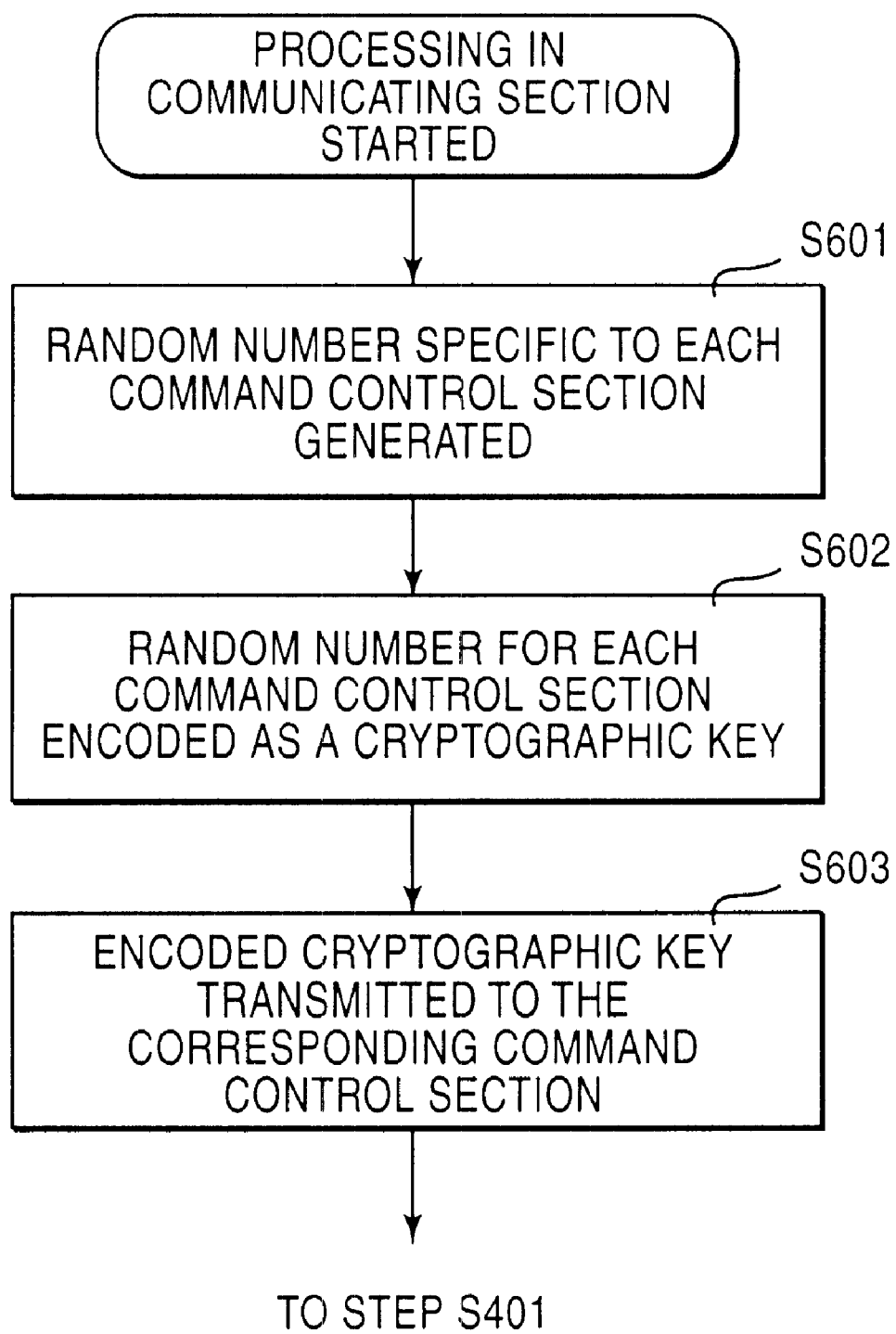
FIG. 20 is a flow chart illustrating main operations executed in the communicating section in Embodiment 6.
Figure 21:
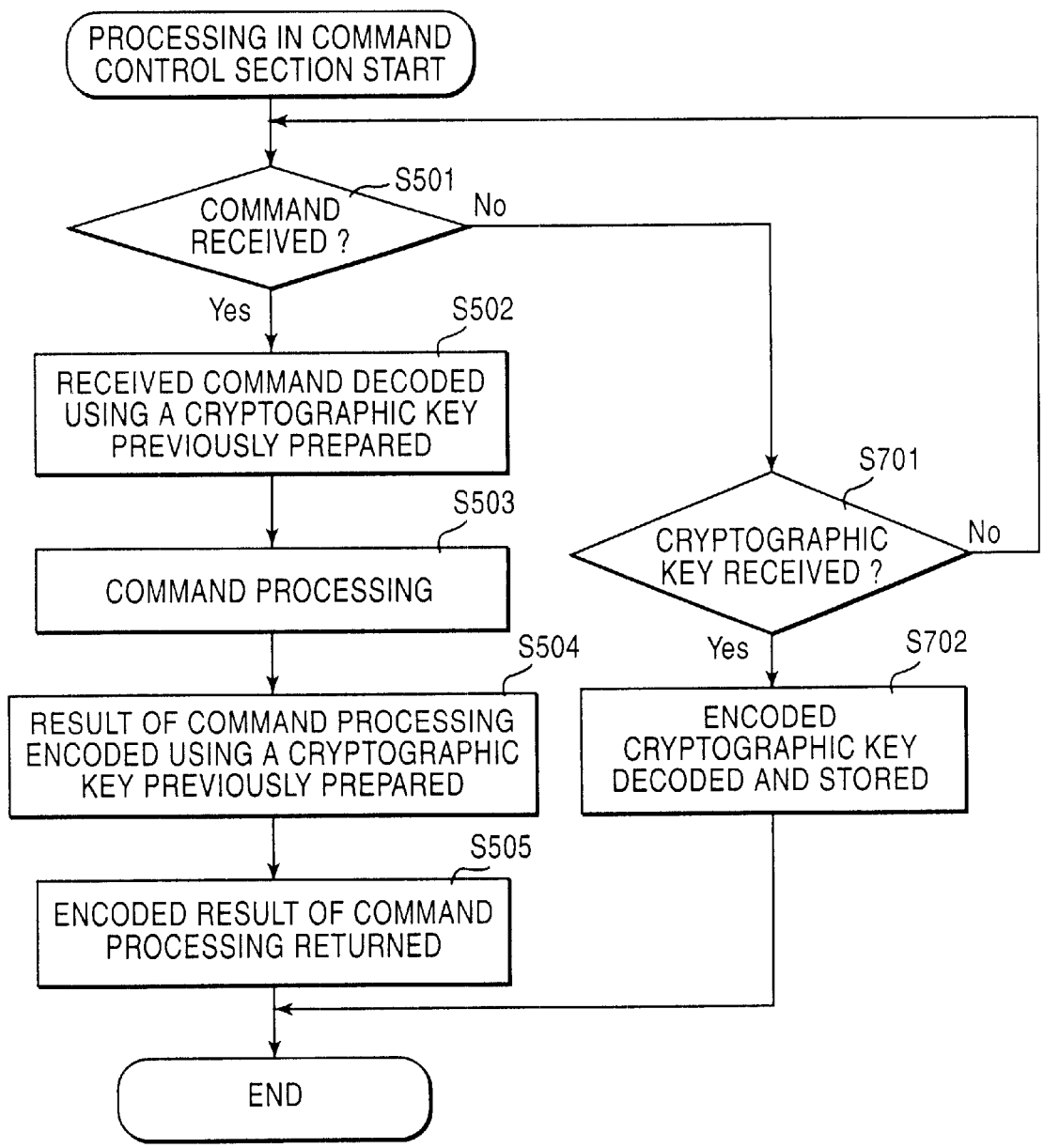
FIG. 21 is a flow chart illustrating operations executed in the command control section in Embodiment 6.

Next, description is made for operations. FIG. 20 is a flow chart for illustrating main operations executed in the communicating section and FIG. 21 is a flow chart for illustrating operations executed in the command control section according to Embodiment 6. The random generator 20 is operated and processing for generating a random number for each of the command control sections is executed. Using the generated random numbers, for instance, cryptographic keys c1, c2, c3 for the command control sections 2F-1, 2F-2, 2F-3 respectively are obtained (step S601).

The cryptographic keys c1, c2, c3 are transferred to the corresponding command control sections 2F-1, 2F-2, 2F-3 respectively, and before transfer, the cryptographic keys c1, c2, c3 themselves are ciphered with the cryptographic key a prepared beforehand(step S602). The ciphered cryptographic keys c1, c2, c3 are transferred to the corresponding command control sections 2F-1, 2F-2 and F-3 respectively.

On the other hand, the processing as shown in FIG. 21 is executed in the command control section. Herein description is made for the command control section 2F-1 as a representative thereof. It is determined whether a command is received (step S501, YES), or a cryptographic key is received (step S701, YES). When a command is received (step S501, YES), as the cryptographic key c1 for encoding or decoding data has been prepared in the command control section 2F-1, the received command is deciphered by using the cryptographic key c1 (step S503).

The subsequent operation has already been explained in relation to FIG. 13, so that description thereof is omitted. On the other hand, when cryptographic key c1 is received (step S701, YES), the ciphered cryptographic key c1 is deciphered with the cryptographic key a previously prepared, and the deciphered cryptographic key c1 is stored (step S702). Then the processing is terminated.

As described above, with Embodiment 6, a cryptographic key allocated to each of the command control sections 2F-1 to 2F-3 is updated by a random number generator 20, so that the capability of preventing illegal operation can be enhanced further. It should be noted that, although configuration of Embodiment 6 does not include a diagnosing function, a diagnosing function described in Embodiments 1 to 4 may be added thereto.

In addition, before an ciphered command is transferred to the command control section, a cryptographic key used for encoding the command is ciphered with the specific cryptographic key a with the ciphered cryptographic key reported to the command control section and, in the command control sections 2F-1 to 2F-3 the cryptographic key reported from the communicating section 1F is deciphered with the specified cryptographic key a and, a command sent from the communicating section 1F is deciphered using the deciphered cryptographic key. With this configuration, an illegal operation in each command transfer can be prevented.

In the Embodiment 1 described above, a triplexed value control section comprising three units of command control sections is corresponded to one unit of communicating section, however, configuration of the present invention is not limited to this. Like in Embodiment 7 described below, one unit of triplexed value control section may be corresponded to plural communicating sections and a fail-safe function for an access path may be realized. General configuration of Embodiment 7 described below is the same as that of Embodiment 1, and same reference numerals are used for the same components and different reference numerals are used for different components.

Figure 22:
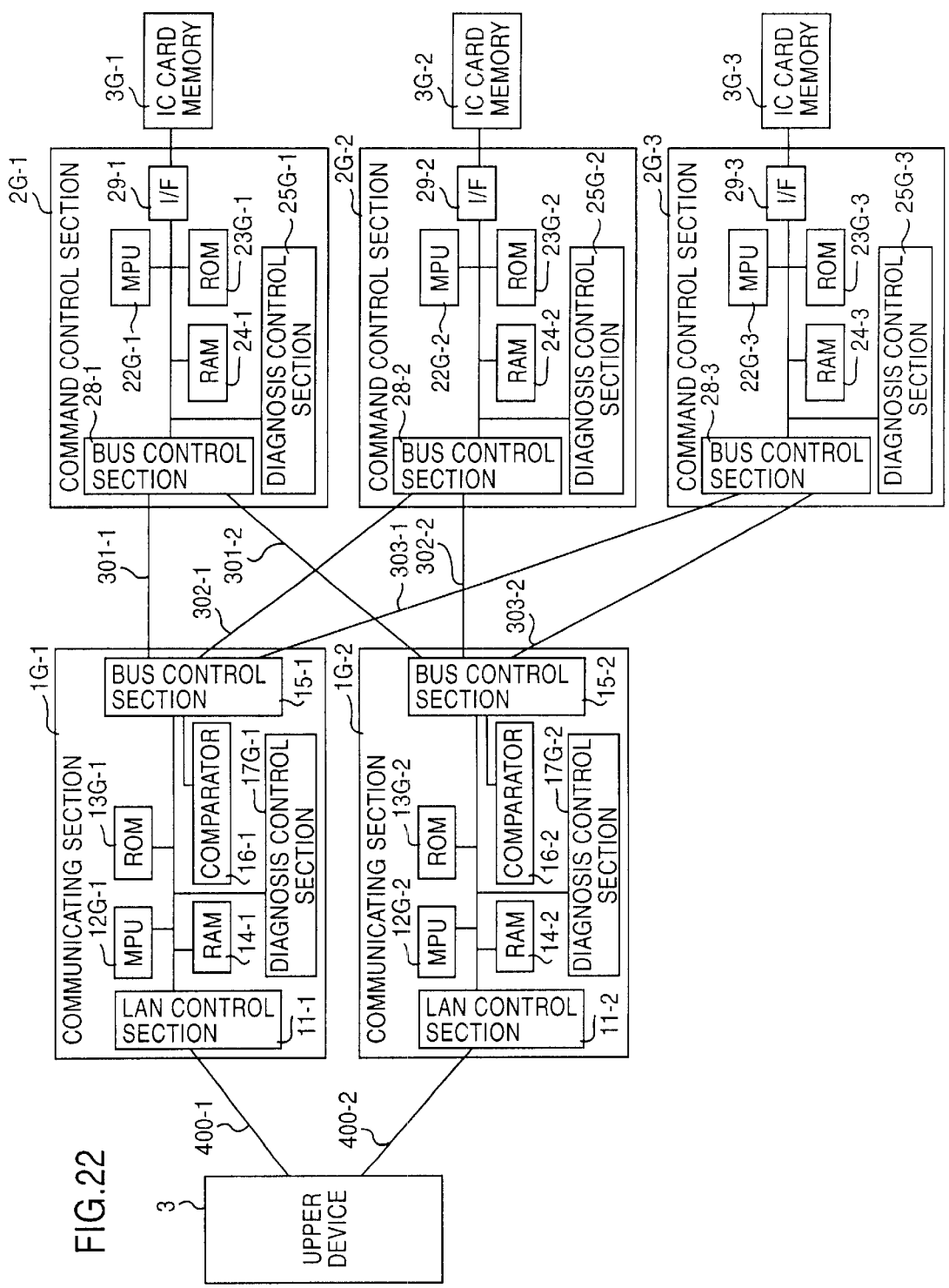
FIG. 22 is a block diagram showing one example of main configuration of an electronic money system including the safe for electronic money according to Embodiment 7.

At first, description is made for the configuration. FIG. 22 is a block diagram showing general configuration of the Embodiment 7, and in this figure, a tray 1200-1 is shown as a representative of the 8 trays accommodated in the safe 1000 shown in FIG. 3. The tray 1200-1 comprises, as shown in FIG. 22, for instance, two units of communicating sections 1G-1, 1G-2 and, also for instance, a triplexed value control section. The communicating sections 1G-1, 1G-2 are connected to the upper device (equivalent to the money server 1800) through the bus interfaces 400-1, 400-2 respectively.

The triplexed value control section comprises three command control sections 2G-1, 2G-2, 2G-3 and IC card memories 3G-1, 3G-2, 3G-3 connected to each command control sections 2G-1, 2G-2, 2G-3 respectively. The IC card memories 3G-1, 3G-2, 3G-3 are non-volatile memories each for storing electronic money indicating a value of currency with electronic data.

The communicating sections 1G-1, 1G-2 and command control section 2G-1 are connected with the bus interfaces 301-1, 301-2. Similarly, the communicating sections 1G-1, 1G-2 and command control sections 2G-2 are connected with the bus interfaces 302-1, 302-2, and the communicating sections 1G-1, 1G-2 and command control section 2G-3 are connected with the bus interfaces 303-1, 303-2.

The communicating section 1G-1 comprises, a LAN control section 11-1, a MPU 12G-1, a ROM 13G-1, a RAM 14-1, a bus control section 15-1, a comparator 16-1 and a diagnosis control section 17G-1. It should be noted that, this communicating section functions in a similar way as the communicating section of Embodiment 1 and description thereof is omitted herein.

The communicating section 1G-2 comprises, a LAN control section 11-2, a MPU 12G-2, a ROM 13G-2, a RAM 14-2, a bus control section 15-2, a comparator 16-2 and a diagnosis control section 17G-2. It should be noted that, this communicating section functions in a similar way as the communicating section of Embodiment 1 and description thereof is omitted herein.

The command control section 2G-1 comprises, a bus control section 28-1, a MPU 22G-1, a ROM 23G-1, a RAM 24-1, a diagnosis control section 25G-1 and an interface 29-1. The bus control section 28-1 is connected to the bus control sections 15-1, 15-2 with the bus interfaces 301-1, 301-2 respectively. It should be noted that, this command control section functions in a similar way as the command control section of Embodiment 1 and description thereof is omitted.

The command control section 2G-2 comprises, a bus control section 28-2, a MPU 22G-2, a ROM 23G-2, a RAM 24-2, a diagnosis control section 25G-2 and an interface 29-2. The bus control section 28-2 is connected to the bus control sections 15-1, 15-2 with the bus interfaces 302-1, 302-2. It should be noted that, this command control section functions in a similar way as the command control section of Embodiment 1 and description thereof is omitted.

The command control section 2G-3 comprises, a bus control section 28-3, a MPU 22G-3, a ROM 23G-3, a RAM 24-3, a diagnosis control section 25G-3 and an interface 29-3. The bus control section 28-3 is connected to the bus control sections 15-1, 15-2 with the bus interfaces 303-1, 303-2 respectively. It should be noted that, this command control section functions in a similar way as the command control section of Embodiment 1 and description thereof is omitted.

Figure 23:
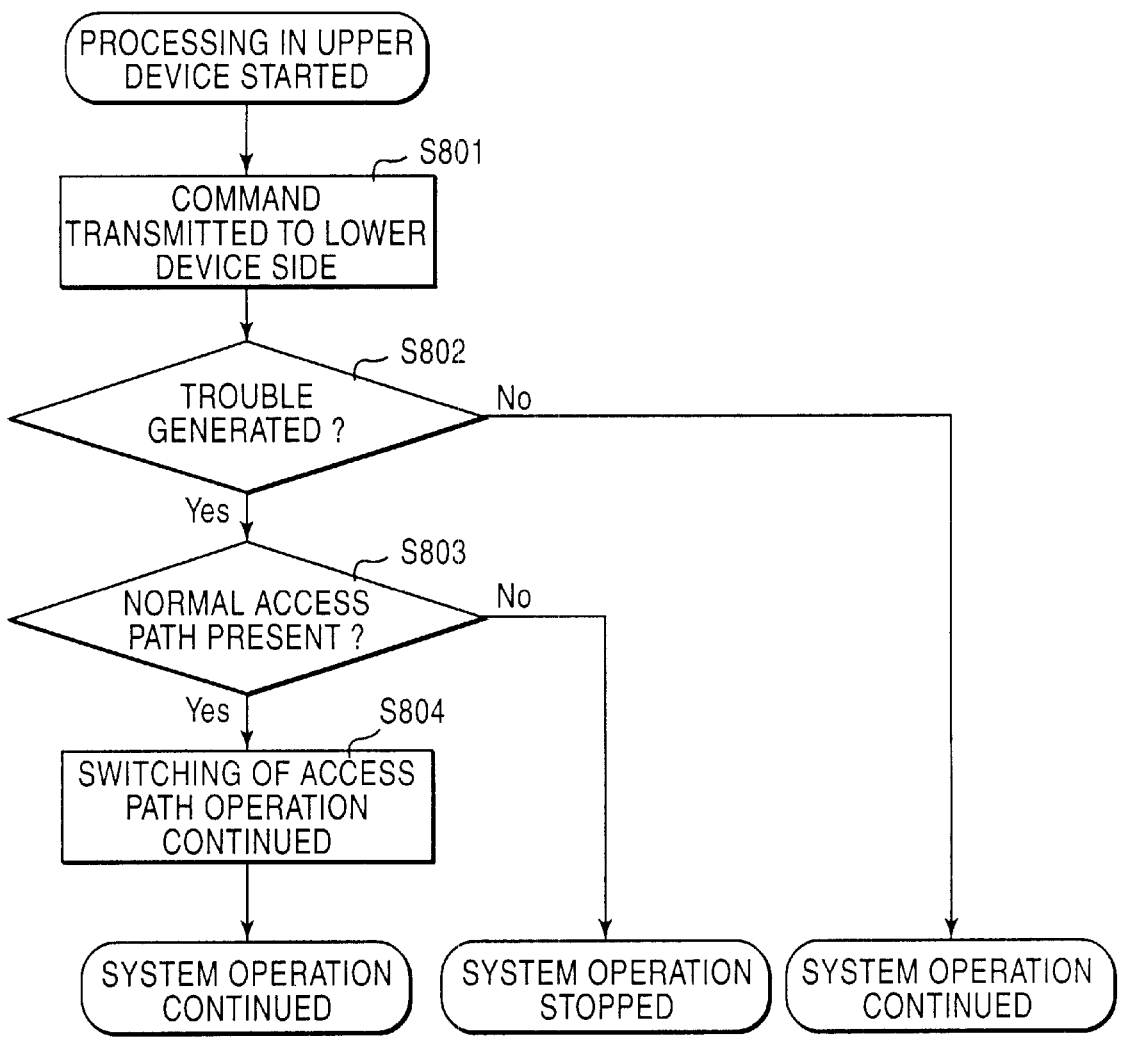
FIG. 23 is a flow chart for illustrating operations in Embodiment 7.
Figure 24:
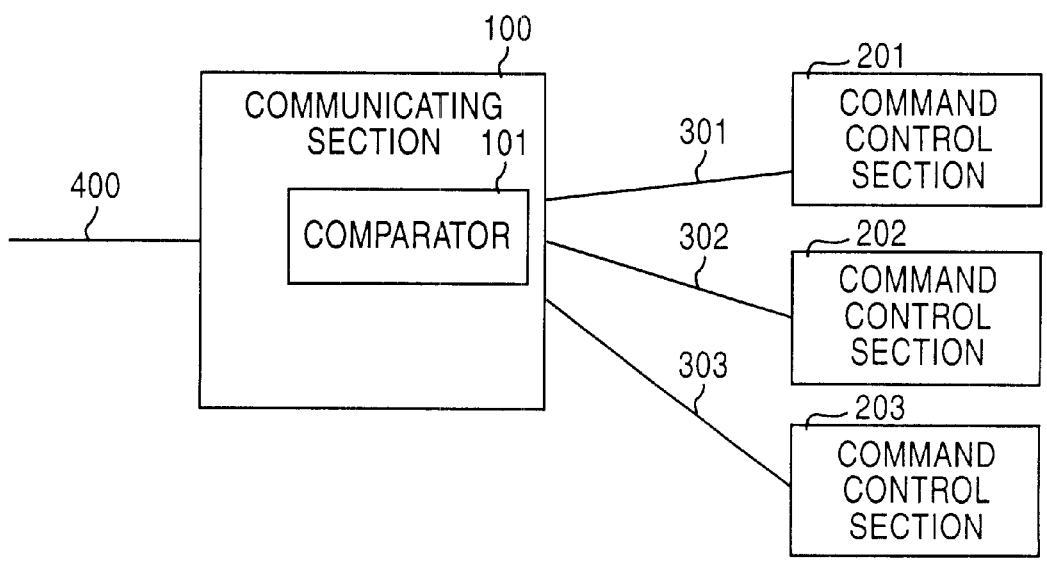
FIG. 24 is a block diagram showing functional configuration of a safe for electronic money based on the conventional technology.
Figure 25A:
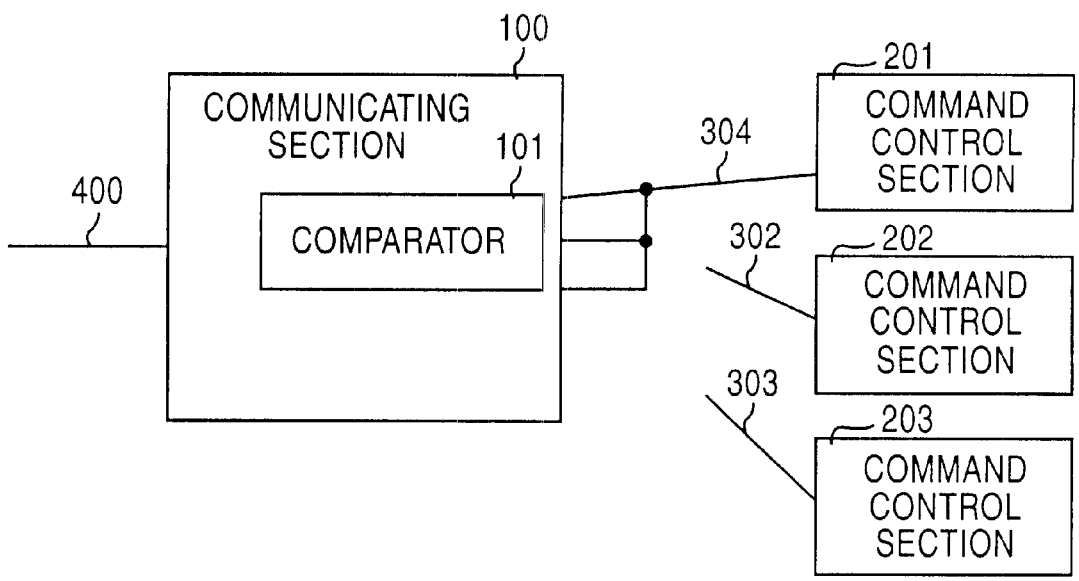
FIGS. 25A and 25B are views showing an example of illegal modification of an interface between the communicating section and command control section each based on the conventional technology.
Figure 25B:
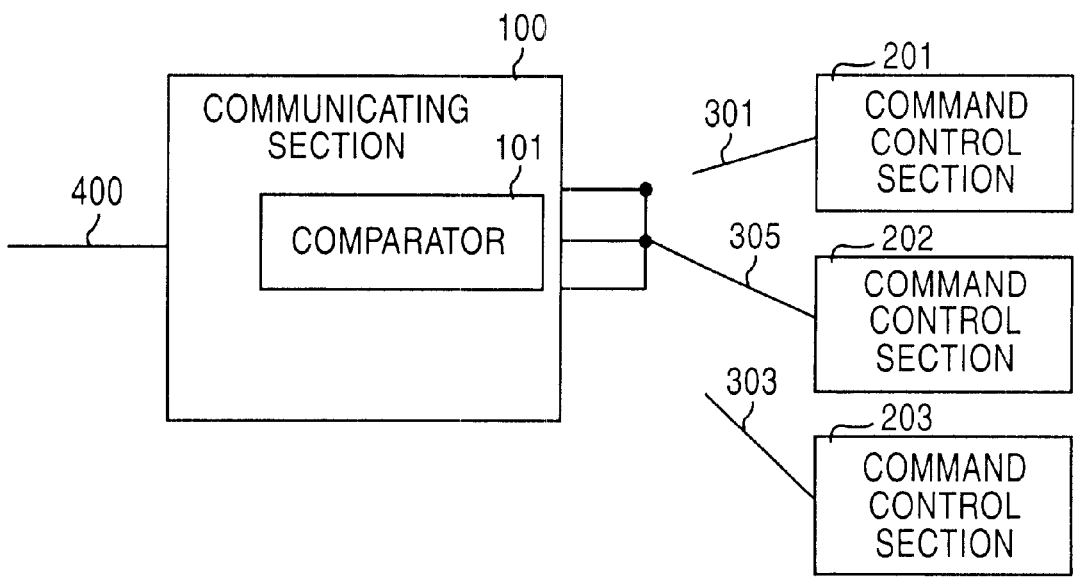

Herein description is made for operations as an electronic money system including the upper device 3. Specifically, description is made for operations of the upper device 3 which controls the operations of each tray. FIG. 23 is a flow chart illustrating operations of the upper device 3 for management of an access path. After a command is transmitted via the bus interface 400-1 or 400-2 from the upper device 3 (step S801), if any trouble is detected in the bus interface 400-1 or 400-2 being used (step S802, YES), checking is made for another access path functioning normally, namely for another normal bus interface.

When it is determined that there is a bus interface functioning normally, communication is made using that bus interface (step S804). With this configuration, an access path is switched and the normal system operation is continued. On the other hand, when no bus interface is functioning normally (step S803, NO), as both the bus interfaces 400-1 and 400-2 are unavailable, system operations are stopped. If no trouble is detected in step S802, the system operations are continued.

Herein "trouble" means a trouble in interfacing, communication or command control in the system based on the bus interface 400-1 or 400-2.

As described above, with Embodiment 7, a plurality of paths are provided between the upper device 3 and a safe in an electronic money system, and when a trouble is generated in any path, communication is executed using a path which is normal, so that the fail-safe function can be realized to continue normal communications.

Although description of Embodiment 7 above was made assuming that the configuration is the same as that of Embodiment 1, configuration of this invention is not limited to this and configuration of any of other embodiments may be employed in Embodiment 7.

Present invention was described above with reference to embodiments thereof, but various types of modification are possible within the gist of the present invention, and the modifications are not excluded from a scope of the present invention.

With the invention, a command from an upper device is transferred from a communicating section to a command control section and a result of the command processing is transferred from the command control section to the communicating section through a first interface and, a command for diagnosis is transferred from the communicating section to the command control section and a result of the diagnosis is transferred from the command control section to the communicating section through a second interface, so that, even if a path for command processing is illegally operated, the illegal operation can easily be detected from the path for diagnosis, whereby it is possible to prevent multiplex drawing of a value by multiplexing control, and for this reason there is provided the advantage that it is possible to obtain a safe for electronic money which can prevent multiplex drawing of a value by multiplexing control.

With the invention, paths for command processing and diagnosis are physically independent from each other, so that an illegal operation can easily be detected for each path, whereby it is possible to prevent multiplex drawing of a value by multiplexing control, and for this reason there is provided the advantage that it is possible to obtain a safe for electronic money which can prevent multiplex drawing of a value by multiplexing control.

With the invention, a command from an upper device is transferred from a communicating section to a command control section and a result of the command processing is transferred from the command control section to the communicating section and a command for diagnosis is transferred from the communicating section to the command control section and a result of the diagnosis is transferred from the command control section to the communicating section through one interface, so that, even if a path for command processing illegally operated, the illegal operation can easily be detected from the path for diagnosis during the data processing, whereby it is possible to prevent multiplex drawing of a value by multiplexing control, and for this reason there is provided the advantage that it is possible to obtain a safe for electronic money which can prevent multiplex drawing of a value by multiplexing control.

With the invention, command processing to a plurality of command control sections is executed at the same timing, whereby there is provided the advantage that it is possible to obtain a safe for electronic money which can prevent an illegal operation by adjusting the timing.

With the invention, the communicating section controls the processing for diagnosis to a plurality of command control sections at the same timing, whereby there is provided the advantage that it is possible to obtain a safe for electronic money which can prevent illegal operations by adjusting the timing.

With the invention, the communicating section controls command processing to a plurality of command control sections at different timing, whereby there is provided the advantage that it is possible to obtain a safe for electronic money which can prevent an illegal operation by adjusting the timing.

With the invention, the communicating section controls processing for diagnosis to a plurality of command control sections at different timing, whereby there is provided the advantage that it is possible to obtain a safe for electronic money which can prevent illegal operations by adjusting the timing.

With the invention, a plurality of command control sections are connected to each bus interface, whereby there is provided the advantage that it is possible to obtain a safe for electronic money which can prevent an illegal operation for each bus.

With the invention, the communicating section sets the timing for data transfer in the command control sections connected to each bus interface arbitrarily, whereby there is provided the advantage that it is possible to obtain a safe for electronic money which has the enhanced capability for preventing an illegal operation as compared to a case where transfer is made according to a fixed sequence.

With the invention, the communicating section executes coding and decoding in communication with the command control section using a specific cryptographic key allocated to each command control section and the command control section executes coding and decoding in communication with the communicating section using a specific cryptographic key allocated to the command control section, whereby there is provided the advantage that it is possible to obtain a safe for electronic money which can maintain security for transferred contents for each command control section.

With the invention, a cryptographic key allocated to each command control section is updated with a random number generator, so that the cryptographic key is not fixed, whereby it is possible to obtain a safe for electronic money which has the enhanced capability for preventing an illegal operation.

With the invention, before an ciphered command is transferred to the command control section, the cryptographic key used for encoding the command is ciphered with a specified cryptographic key and the ciphered command is notified, while, in the command control section, the cryptographic key notified from the communicating section is deciphered with a specified cryptographic key and an ciphered command transferred from the communicating section is deciphered by using the deciphered cryptographic key, whereby there is provided the advantage that it is possible to obtain a safe for electronic money which can prevent illegal operations each time a command is transferred.

With the invention, a plurality of paths are provided between the upper device and the safe for electronic money, and when a path in which a trouble has been generated is detected, communication is executed by switching to a path which is normal, whereby there is provided the advantage that it is possible to obtain an electronic money system which can realize the fail-safe function for continuing communications.

This application is based on Japanese patent application No. HEI 10-196109 filed in the Japanese Patent Office on Jul. 10, 1998, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A computer safe system for electronic money having a plurality of storage sections each for storing therein electronic money expressing a value of currency with electronic information for transferring electronic money between a user and an IC card; said safe comprising:

a plurality of command control sections for executing commands to said storage sections in parallel for realizing the control function of said storage sections;

a communicating section having communication paths corresponding to a number of command in parallel between said command control sections for realizing the communicating function with said storage sections;

a first interface for connecting each of said command control sections to said communicating section to transfer a command for transfer of electronic money from said communicating section to said command control sections and to transfer a result of processing according to the command from said command control section to said communicating section; and a second interface for connecting each of said command control sections to said communicating section to transfer a command for diagnosis from said communicating section to said command control section according to controls by said communicating section and to transfer a result of the diagnosis from said command control section to said communicating section, wherein an illegal operation of said command transfer of electronic money is detected by said diagnosis result.

2. A safe for electronic money according to claim 1; wherein said communicating section controls the processing for diagnosis by said second interface independently from the command processing by said first interface and each of said command control sections executes the processing for diagnosis with said second interface independently from the command processing by said first interface.

3. A safe for electronic money according to claim 1; wherein said communicating section controls the command processing according to said plurality of command control sections at the same timing.

4. A safe for electronic money according to claim 1; wherein said communicating section controls the diagnosing processing according to said plurality of command control section at the same timing.

5. A safe for electronic money according to claim 1; wherein said communicating section controls the command processing according to said plurality of command control section at different timing.

6. A safe for electronic money according to claim 1; wherein said communicating section controls the diagnosing processing according to said plurality of command control sections at different timing.

7. A safe for electronic money according to claim 1; wherein a specific cryptographic key is allocated to each of said command control sections, said communicating section has the specific cryptographic key allocated to each of the command control sections and executes ciphering and deciphering in communication with said command control section using the specific cryptographic key allocated to each command control section, and said command control section executes ciphering and deciphering in communication with said communicating section using the specific cryptographic key allocated to said command control section itself.

8. A safe for electronic money according to claim 7; wherein said communicating section has a random number generator for generating a cryptographic key using random numbers and updates a cryptographic key allocated to each command control section with the random number generator.

9. A safe for electronic money according to claim 8; wherein a specific cryptographic key is shared by said communicating section and said command control section, said communicating section ciphers a cryptographic key used for ciphering the command with the specified cryptographic key and informs said command control section of the ciphered cryptographic key with the specified cryptographic key before transferring the ciphered command to said command control section, the command control section deciphers the cryptographic key received from said communicating section with the specified cryptographic key and deciphers the ciphered command transferred from said communicating section using the deciphered cryptographic key.

10. A computer safe system for electronic money having a plurality of storage sections each for storing therein electronic money expressing a value of currency with electronic information for transferring electronic money between a user and an IC card; said safe comprising:
    a plurality of command control sections for executing commands to said storage sections in parallel for realizing the control function of said storage sections;
    a communicating section having communication paths corresponding to a number of command in parallel between said command control sections for realizing the communicating function with said storage sections; and
    an interface for connecting each of said command control sections to said communicating section to transfer a command for transfer of electronic money from said communicating section to said command control section according to controls by said communicating section and to transfer a result of the command processing from said command control section to said communicating section and, to transfer a command for diagnosis from said communicating section to said command control section and transfer a result of the diagnosis from said command control section to said communicating section, wherein an illegal operation of said command transfer of electronic money is detected by said diagnosis result.

11. A safe for electronic money according to claim 10; wherein said communicating section controls the command processing according to said plurality of command control sections at the same timing.

12. A safe for electronic money according to claim 10; wherein said communicating section controls the diagnosing processing according to said plurality of command control section at the same timing.

13. A safe for electronic money according to claim 10; wherein said communicating section controls the command processing according to said plurality of command control section at different timing.

14. A safe for electronic money according to claim 10; wherein said communicating section controls the diagnosing processing according to said plurality of command control sections at different timing.

15. A safe for electronic money according to claim 10; wherein said interface unit comprises a plurality of bus interfaces and each of said command control sections is connected to one bus interface.

16. A safe for electronic money according to claim 15; wherein said communicating section sets a transfer timing for each command control sections connected to each bus interface arbitrarily.

17. A safe for electronic money according to claim 10; wherein a specific cryptographic key is allocated to each of said command control sections, said communicating section has the specific cryptographic key allocated to each of the command control sections and executes ciphering and deciphering in communication with said command control section using the specific cryptographic key allocated to each command control section, and said command control section executes ciphering and deciphering in communication with said communicating section using the specific cryptographic key allocated to said command control section itself.

18. A safe for electronic money according to claim 17; wherein said communicating section has a random number generator for generating a cryptographic key using random numbers and updates a cryptographic key allocated to each command control section with the random number generator.

19. A safe for electronic money according to claim 18; wherein a specific cryptographic key is shared by said communicating section and said command control section, said communicating section ciphers a cryptographic key used for ciphering the command with the specified cryptographic key and informs said command control section of the ciphered cryptographic key with the specified cryptographic key before transferring the ciphered command to said command control section, the command control section deciphers the cryptographic key received from said communicating section with the specified cryptographic key and deciphers the ciphered command transferred from said communicating section using the deciphered cryptographic key.

20. A computer electronic money system comprising:
    an upper device for managing electronic money indicating a value of currency with electronic information;
    a safe for electronic money for processing electronic money according to controls by said upper device; and
    a plurality of upper paths each connecting said upper device to said safe; wherein said safe comprises:
        storage sections for storing therein said electronic money;
        a plurality of command control sections for executing commands to said storage section in parallel and realizing the control function of said storage sections;
        a plurality of communicating sections each connected to said upper device with an independent path respectively for forming communicating paths corresponding to a number of commands with said command control sections in parallel and logically realizing the communicating function with said storage sections when making said command control sections execute command processing with commands upon a request from said upper device, or when diagnosing said command control section with a command; and
        a plurality of lower paths for connecting each of said command control section to said communicating sections;
    wherein said upper device executes communicates, when a trouble occurs in one or more of said upper paths, by switching the current path or paths to a normal path.

* * * * *